US012756804B2

(12) United States Patent
Kim et al.

(10) Patent No.: US 12,756,804 B2
(45) Date of Patent: Oct. 6, 2026

(54) ELECTRONIC DEVICE AND OPERATING METHOD OF THE ELECTRONIC DEVICE

(71) Applicant: Samsung Electronics Co., Ltd., Suwon-si (KR)

(72) Inventors: Donguk Kim, Suwon-si (KR); Sehyun Kim, Suwon-si (KR); Yeonwoo Kim, Suwon-si (KR); Jongin Lee, Suwon-si (KR); Donghwa Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 15 days.

(21) Appl. No.: 18/899,575

(22) Filed: Sep. 27, 2024

(65) Prior Publication Data

US 2025/0142033 A1 May 1, 2025

Related U.S. Application Data

(63) Continuation of application No. PCT/KR2024/013071, filed on Aug. 30, 2024.

(30) Foreign Application Priority Data

Oct. 30, 2023 (KR) ........................ 10-2023-0146994

(51) Int. Cl.
*H04N 9/31* (2006.01)
*G06F 3/14* (2006.01)

(52) U.S. Cl.
CPC ............. *H04N 9/3185* (2013.01); *G06F 3/14* (2013.01)

(58) Field of Classification Search
CPC .... H04N 9/3185; H04N 9/3194; H04N 9/317; H04N 9/3173; H04N 9/3188; H04N 9/3191; G03B 21/142; G03B 21/147
See application file for complete search history.

(56) References Cited

U.S. PATENT DOCUMENTS

| | | | | |
|---|---|---|---|---|
| 9,158,184 | B2 | 10/2015 | Tsuji et al. | |
| 11,417,135 | B2 | 8/2022 | Suzuki et al. | |
| 2008/0239153 | A1 | 10/2008 | Chiu | |
| 2012/0008101 | A1* | 1/2012 | Oka ..................... | G03B 21/147 353/69 |

(Continued)

FOREIGN PATENT DOCUMENTS

| | | |
|---|---|---|
| JP | 2006-157329 | 6/2006 |
| JP | 2013-98836 | 5/2013 |

(Continued)

OTHER PUBLICATIONS

International Search Report dated Dec. 3, 2024 for International Application No. PCT/KR2024/013071.

*Primary Examiner* — John W Miller
*Assistant Examiner* — Humam M Satti
(74) *Attorney, Agent, or Firm* — STAAS & HALSEY LLP

(57) ABSTRACT

An electronic device including an image display portion through which to display content; and at least one processor configured to set a calibration threshold value based on a usage environment of the electronic device, calculate an amount of an external impact applied to the electronic device, compare the calculated amount of the external impact and a magnitude of the set calibration threshold value, and perform a calibration of the image display portion based on the calculated amount of the external impact being greater than the set calibration threshold value.

20 Claims, 15 Drawing Sheets

(56) References Cited

U.S. PATENT DOCUMENTS

| | | | | |
|---|---|---|---|---|
| 2012/0188289 | A1* | 7/2012 | Lin | H04N 9/3182 345/690 |
| 2012/0257795 | A1 | 10/2012 | Kim et al. | |
| 2016/0112688 | A1* | 4/2016 | Brunn | H04N 9/3194 345/156 |
| 2018/0218710 | A1 | 8/2018 | Park et al. | |
| 2021/0314538 | A1 | 10/2021 | Yoon et al. | |
| 2022/0295026 | A1* | 9/2022 | Wu | G01S 17/08 |
| 2023/0276033 | A1* | 8/2023 | Kashiwagi | H04N 9/3182 348/744 |
| 2024/0195946 | A1 | 6/2024 | Chae et al. | |
| 2024/0259538 | A1 | 8/2024 | Kim et al. | |
| 2025/0142032 | A1* | 5/2025 | Choi | H04N 9/3167 |

FOREIGN PATENT DOCUMENTS

| | | | | | |
|---|---|---|---|---|---|
| JP | 2015-145892 | | | 8/2015 | |
| JP | 2020-52380 | | | 4/2020 | |
| JP | 7211367 | | | 1/2023 | |
| KR | 2003-0037402 | | | 5/2003 | |
| KR | 10-2009-0115234 | | | 11/2009 | |
| KR | 10-2012-0115014 | | | 10/2012 | |
| KR | 10-2017-0005756 | | | 1/2017 | |
| KR | 10-2021-0123059 | | | 10/2021 | |
| KR | 10-2023-0020798 | | | 2/2023 | |
| KR | 10-2023-0065509 | | | 5/2023 | |
| KR | 20250101480 | A | * | 7/2025 | H04N 9/31 |
| WO | WO-2015146805 | A1 | * | 10/2015 | G03B 21/145 |
| WO | WO 2023/068522 | A1 | | 4/2023 | |

* cited by examiner

ELECTRONIC DEVICE AND OPERATING METHOD OF THE ELECTRONIC DEVICE

CROSS-REFERENCE TO RELATED APPLICATIONS

This application is a continuation application, claiming priority under § 365 (c), of International Application No. PCT/KR2024/013071, filed on Aug. 30, 2024, which is based on and claims the benefit of Korean Patent Application Number 10-2023-0146994, filed on Oct. 30, 2023, the disclosures of which are incorporated by reference herein in their entireties.

TECHNICAL FIELD

The disclosure relates to an electronic device and an operating method of the same. In particular, the disclosure relates to an electronic device for displaying content and an operating method of the electronic device.

BACKGROUND ART

With the development of electronic technology, a variety of electronic devices for providing users with content, such as videos, images, and the like, have been developed and distributed.

Furthermore, with the development of optical technology, projector type electronic devices that provide users with content by projecting images onto a screen or a specific space have been developed and distributed.

For projectors that project images, to focus an image displayed through an image display portion, an operation of calibrating the focus of an image display portion may be performed. Furthermore, to prevent an image displayed through the image display portion from being distorted, an operation of correcting a keystone of the image display portion may be performed.

DISCLOSURE

Technical Solution

According to an embodiment of the disclosure, an electronic device includes an image display portion through which to display content; a memory that stores at least one instruction; and at least one processor configured to execute the at least one instruction stored in the memory, wherein the at least one processor is further configured to set a calibration threshold value based on a usage environment of the electronic device, calculate an amount of an external impact applied to the electronic device, compare the calculated amount of the external impact and a magnitude of the set calibration threshold value, and perform a calibration of the image display portion based on the calculated amount of the external impact being greater than the set calibration threshold value.

According to an embodiment of the disclosure, the at least one processor may be configured to not perform the calibration of the image display portion based on the calculated amount of the external impact being less than or equal to the set calibration threshold value.

According to an embodiment of the disclosure, the electronic device may further include at least one of a time of flight (ToF) sensor, an acceleration sensor, or a gyro sensor. The at least one processor may be configured to calculate the amount of the external impact based on detection of the external impact by the at least one of the ToF sensor, the acceleration sensor, or the gyro sensor.

According to an embodiment of the disclosure, the calibration of the image display portion may include at least one of a keystone correction to correct distortion of the content displayed through the image display portion or a focus adjustment to correct a focus of the content displayed through the image display portion.

According to an embodiment of the disclosure, the usage environment of the electronic device may include an operation mode of the electronic device. The at least one processor may be configured to operate the electronic device in a first mode, in which the content displayed through the image display portion is displayed as augmented reality content, or in a second mode, in which the content displayed through the image display portion is displayed as real world content, based on operating the electronic device in the first mode, set the calibration threshold value to a first value, and, based on operating the electronic device in the second mode, set the calibration threshold value to a second value. The first value may be less than the second value.

According to an embodiment of the disclosure, the usage environment of the electronic device may include complexity of the content displayed through the image display portion. The at least one processor may be configured to determine the complexity of the content based on at least one of an edge component included in the content displayed through the image display portion, a resolution of the content displayed through the image display portion, a frequency component of the content displayed through the image display portion, or a type of the content displayed through the image display portion, and set the calibration threshold value based on the determined complexity of the content displayed through the image display portion.

According to an embodiment of the disclosure, the usage environment of the electronic device may include illuminance of a space in which the electronic device is located. The at least one processor may be configured to measure the illuminance of the space. The magnitude of the calibration threshold value may be set to be greater as the measured illuminance of the space increases.

According to an embodiment of the disclosure, the at least one processor may be configured to determine a type of the content displayed through the image display portion, and not perform the calibration of the image display portion based on the determined type of the content being included in preset specific content.

According to an embodiment of the disclosure, the at least one processor may be configured to not perform the calibration of the image display portion based on obtaining a selection signal including information for selecting not to perform the calibration of the image display portion.

According to an embodiment of the disclosure, the at least one processor may be configured to not perform the calibration of the image display portion based on obtaining an input signal provided for the content.

According to an embodiment of the disclosure, provided is a method of operating an electronic device including an image display portion through which to display content, the method including setting a calibration threshold value based on a usage environment of the electronic device; calculating an amount of an external impact applied to the electronic device; comparing the calculated amount of the external impact with a magnitude of the set calibration threshold value; and performing a calibration of the image display portion based on the calculated amount of the external impact being greater than the set calibration threshold value in the comparing of the amount of the external impact with the calibration threshold value.

According to an embodiment of the disclosure, the method may further include not performing the calibration of the image display portion based on the calculated amount of the external impact being less than or equal to the set calibration threshold value.

According to an embodiment of the disclosure, the electronic device may include at least one of a time of flight (ToF) sensor, an acceleration sensor, or a gyro sensor. The calculating may calculate the amount of the external impact based on detection of the external impact by the at least one of the ToF sensor, the acceleration sensor, or the gyro sensor.

According to an embodiment of the disclosure, the usage environment of the electronic device may include an operation mode of the electronic device. The method may further include operating the electronic device in a first mode, in which the content displayed through the image display portion is displayed as augmented reality content, or in a second mode, in which the content displayed through the image display portion is displayed as real world content, based on operating the electronic device in the first mode, setting the calibration threshold value to a first value, and, based on operating the electronic device in the second mode, setting the calibration threshold value to a second value. The first value may be less than the second value.

According to an embodiment of the disclosure, the usage environment of the electronic device may include complexity of the content displayed through the image display portion. The method may further include determining the complexity of the content based on at least one of an edge component included in the content displayed through the image display portion, a resolution of the content displayed through the image display portion, a frequency component of the content displayed through the image display portion, or a type of the content displayed through the image display portion, and setting the calibration threshold value based on the determined complexity of the content displayed through the image display portion.

According to an embodiment of the disclosure, the usage environment of the electronic device may include illuminance of a space in which the electronic device is located. The method may further include measuring the illuminance of the space, and setting the calibration threshold value to be greater as the measured illuminance of the space increases.

According to an embodiment of the disclosure, the method may further include determining a type of the content displayed through the image display portion; and not performing the calibration of the image display portion based on the determined type of the content being included in preset specific content.

According to an embodiment of the disclosure, the method may further include determining whether a selection signal including information for selecting not to perform the calibration of the image display portion is obtained; and not performing the calibration of the image display portion based on determining that the selection signal is obtained.

According to an embodiment of the disclosure, the method may further include determining whether an input signal provided for the content is obtained; and not performing the calibration of the image display portion based on determining that the input signal is obtained.

According to an embodiment of the disclosure, provided is a computer-readable recording medium having recorded thereon a program, which when executed by a computer, performs a method of operating an electronic device including an image display portion through which to display content, the method including setting a calibration threshold value based on a usage environment of the electronic device; calculating an amount of an external impact applied to the electronic device; comparing the calculated amount of the external impact with a magnitude of the set calibration threshold value; and performing a calibration of the image display portion based on the calculated amount of the external impact being greater than the set calibration threshold value.

The technical objectives to be achieved by the disclosure are not limited to the above-described objectives, and other technical objectives that are not mentioned herein would be clearly understood by a person of skill in the art from the description of the disclosure.

DESCRIPTION OF DRAWINGS

The disclosure may be readily understood from the following detailed description in conjunction with the accompanying drawings, and reference numerals denote structural elements.

MODE FOR INVENTION

Figure 1:
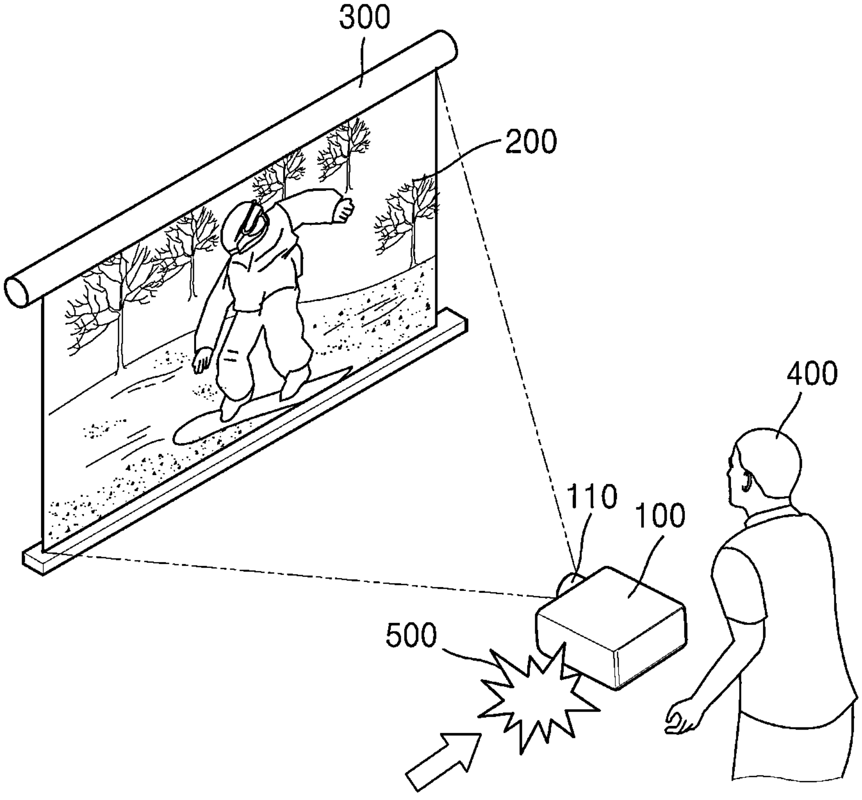
FIG. 1 is a view for explaining operation of an electronic device according to an embodiment of the disclosure.

The terms used in the disclosure are briefly described, and an embodiment of the disclosure is described in detail.

Throughout the disclosure, the expression "at least one of a or b" indicates only a, only b, both a and b, or variations thereof. The expression "at least one of a, b, or c" indicates only a, only b, only c, both a and b, both a and c, both b and c, all of a, b, and c, or variations thereof.

The terms used in the disclosure have been selected from currently widely used general terms in consideration of the functions in the disclosure. However, the terms may vary according to the intention of one of ordinary skill in the art, case precedents, and the advent of new technologies. Also, for special cases, meanings of the terms selected by the applicant are described in detail in the description section. Accordingly, the terms used in the disclosure are defined based on their meanings in relation to the contents discussed throughout the specification, not by their simple meanings.

An expression used in a singular form in the specification also includes the expression in its plural form unless clearly specified otherwise in context. Unless defined otherwise, all terms used herein including technical or scientific terms have the same meanings as those generally understood by those of ordinary skill in the art to which the disclosure may pertain.

When a part may "include" a certain element, unless specified otherwise, it may not be construed to exclude another element but may be construed to further include other elements. Furthermore, terms such as ". . . portion," ". . . unit," ". . . module," and ". . . block" stated in the specification may signify a unit to process at least one function or operation and the unit may be embodied by hardware, software, or a combination of hardware and software.

In the disclosure, the expression "configured to" may be interchangeable with an expression such as "suitable for," "having the capacity to," "designed to," "adapted to," "made to," or "capable of." The expression "configured to" does not necessarily signify one that is "specifically designed to" in hardware. Instead, in some situations, the expression "configured to" may signify one that is "capable of" performing a function with other device or parts. For example, an expression "a processor configured to perform functions A, B, and C" may signify an exclusive processor, for example, an embedded processor, for performing the functions or a generic-purpose processor, for example, a central processing unit (CPU) or an application processor, capable of performing the functions by executing one or more software programs stored in a memory device.

Furthermore, in the disclosure, when an element is "connected to" or "coupled with/to" another element, the element contacts or is connected to the other element directly or through at least one of other elements, unless clearly defined otherwise.

The embodiment of the disclosure is described with reference to the accompanying drawings so that one skilled in the art to which the disclosure pertains can easily implement the disclosure. However, the disclosure is not limited thereto and it will be understood that various changes in form and details may be made therein without departing from the spirit and scope of the following claims. In the drawings, a part that is not related to a description is omitted to clearly describe the disclosure and, throughout the specification, similar parts are referenced with similar reference numerals.

In the following description, an embodiment of the disclosure is described in detail with reference to the accompanying drawings.

FIG. 1 is a view for explaining the operation of an electronic device 100 according to an embodiment of the disclosure.

Referring to FIG. 1, in an embodiment of the disclosure, the electronic device 100 may display content 200 and provides the content 200 to a user 400. In an embodiment of the disclosure, the electronic device 100 may include an image display portion 110 that displays the content 200. The electronic device 100 may provide the content 200 to the user 400 through the image display portion 110.

In an embodiment of the disclosure, in FIG. 1, the electronic device 100 is illustrated as a projector that projects the content 200 to a projection space. In an embodiment of the disclosure, the electronic device 100 may provide the content 200 to the user 400 by projecting the content 200 in a space 300 including the electronic device 100. In an embodiment of the disclosure, the electronic device 100 may be of a fixed type projector fixed in a specific space or a movable type projector arranged at a desired position within the space 300.

However, the disclosure is not limited thereto. The electronic device 100 may be implemented by various types of electronic devices, such as a mobile device, a smart phone, a laptop computer, a desktop computer, a tablet personal computer (PC), a digital broadcasting terminal, a wearable device, and the like. In an embodiment of the disclosure, the electronic device 100 may be implemented by various types of electronic devices to provide the content 200 to the user 400 by displaying the content 200 through the image display portion 110.

In an embodiment of the disclosure, in FIG. 1, the electronic device 100 is illustrated as having a quadrangular shape and being located in an area facing an area where the content 200 is displayed within the space 300, but the disclosure is not limited thereto. The electronic device 100 may have various shapes, such as round and the like, and a relationship between the location where the electronic device 100 is arranged and the area where the content 200 is displayed may be determined depending on how the image display portion 110 provides the content 200.

In an embodiment of the disclosure, the electronic device 100 may perform calibration of the image display portion 110 to increase the visibility of the content 200 displayed in the space 300. In an embodiment of the disclosure, the electronic device 100 may perform the calibration of the image display portion 110 based on a distance between the image display portion 110 and an area of the space 300 where the content 200 is displayed, an angle between the image display portion 110 and the area of the space 300 where the content 200 is displayed, the size and shape of the content 200 to be displayed, the shape of an area where the content 200 is displayed, and the like.

In an embodiment of the disclosure, the calibration of the image display portion 110 may include a keystone correction for correcting distortion of the content 200 or a focus adjustment for adjusting focus of the content 200.

In an embodiment of the disclosure, the keystone correction may be performed to correct distortion in a horizontal direction or vertical direction of the content 200 displayed in the space 300. In an embodiment of the disclosure, the keystone correction may correct a phenomenon in which the content 200 appears to be inclined and distorted depending on a projection angle or a projection height of the content 200 provided from the image display portion 110, the projection angle being determined according to the arrangement of the image display portion 110, the shape of an area of the space 300 in which the content 200 is displayed, or the like. In an embodiment of the disclosure, when the image display portion 110 provides the content 200 in a rectangular shape, the keystone correction may correct that the content 200 projected toward the space 300 is distorted in a horizontal direction or a vertical direction.

In an embodiment of the disclosure, the focus adjustment may be performed to focus the content 200 displayed in the space 300. In an embodiment of the disclosure, the focus adjustment may be performed to allow the content 200 provided from the image display portion 110 to be clearly seen, by adjusting the position or shape of a lens included in the image display portion 110 according to the distance between the image display portion 110 and the space in which the content 200 is displayed.

In an embodiment of the disclosure, the electronic device 100 may increase the visibility of the user 400 with respect to the content 200 displayed in the space 300, by performing the calibration of the image display portion 110.

In an embodiment of the disclosure, when an external impact 500 is applied to the electronic device 100, the electronic device 100 may perform the calibration of the image display portion 110. In an embodiment of the disclosure, even when the arrangement of the electronic device 100 or the arrangement of the image display portion 110 is changed due to the external impact 500, by performing the calibration of the image display portion 110 corresponding to the external impact 500, the electronic device 100 may prevent the content 200 displayed in the space 300 from being distorted or the content 200 from being provided in an unfocused state to the user 400.

In an embodiment of the disclosure, when the external impact 500 is applied to the electronic device 100, without input of the user 400, the electronic device 100 may perform an operation of detecting the external impact 500 applied to the electronic device 100 and automatically calibrating the image display portion 110.

However, in an embodiment of the disclosure, the electronic device 100 may unnecessarily perform an operation of calibrating the image display portion 110 even when the external impact 500 of a small size is applied. In an embodiment of the disclosure, even when the size of the external impact 500 is so small that the content 200 displayed in the space 300 is not distorted or the focus of the content 200 is not changed, the electronic device 100 may perform the calibration of the image display portion 110. Accordingly, a level of immersion of the user 400 watching the content 200 may be decreased, or the visibility of the content 200 may deteriorate.

In an embodiment of the disclosure, the electronic device 100 may set a calibration threshold value that determines whether to calibrate the image display portion 110 based on the usage environment of the electronic device 100. In an embodiment of the disclosure, the electronic device 10 may calculate an amount of impact by detecting the external impact 500. The electronic device 10 may compare the calculated amount of the external impact with the calibration threshold value, and when the amount of the external impact is greater than the calibration threshold value, may perform the calibration of the image display portion 110. The electronic device 100 may perform the calibration of the image display portion 110 considering the usage environment of the electronic device 100, by setting calibration threshold value to be large or small according to the usage environment of the electronic device 100.

In an embodiment of the disclosure, the usage environment of the electronic device 100 may include at least one of an operation mode of the electronic device 100, the complexity of the content 200 displayed through the image display portion 110, or the illuminance of the space 300. The electronic device 100 may set the calibration threshold value based on at least one of the operation mode of the electronic device 100, the complexity of the content 200 displayed through the image display portion 110, or the illuminance of the space 300. Accordingly, by setting the magnitude of the calibration threshold value to be different according to the usage environment of the electronic device 100, a sensitivity in the operation of performing the calibration of the image display portion 110 with respect to the external impact 500 may be set to be different.

Accordingly, improved usage experience may be provided to the user 400 without disturbing the immersion of the user 400 watching the content 200.

Furthermore, in an embodiment of the disclosure, when the type of the content 200 provided through the image display portion 110 is included in a preset specific content (e.g., games, etc.), the electronic device 100 may not perform the calibration of the image display portion 110. In an embodiment of the disclosure, when a selection signal including information for selecting not to perform the calibration of the image display portion 110 is obtained, the electronic device 100 may not perform the calibration of the image display portion 110. In an embodiment of the disclosure, when the electronic device 100 obtains a separate input signal while the content 200 is provided, the electronic device 100 may not perform the calibration of the image display portion 110. Accordingly, improved usage experience may be provided to the user 400 using the electronic device 100.

The effects of the present disclosure are not limited to the above-described effects, and other various effects that are not described in the disclosure may be clearly understood from the following descriptions by one skilled in the art to which the present disclosure belongs.

Figure 2:
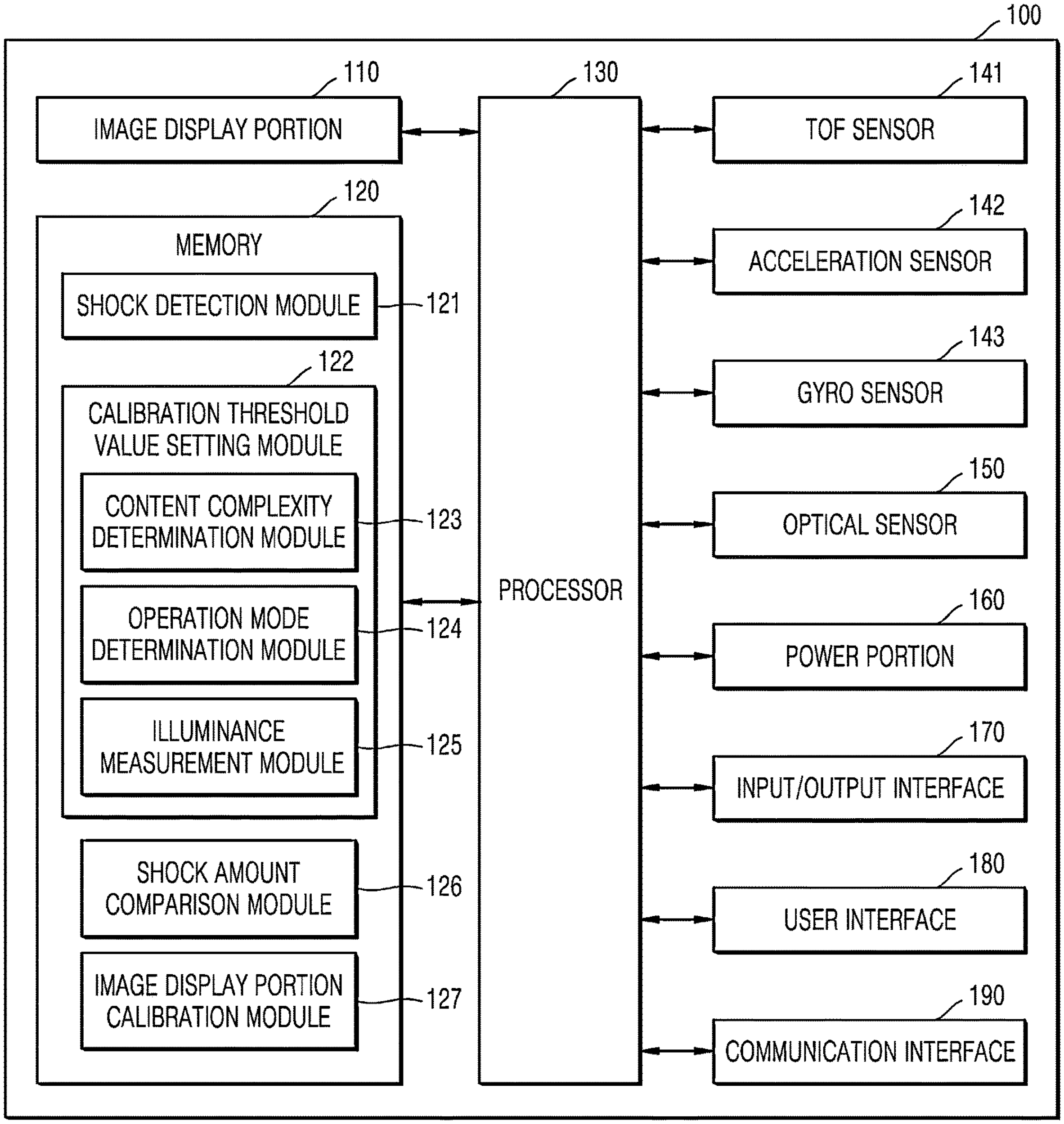
FIG. 2 is a block diagram for explaining a configuration of an electronic device according to an embodiment of the disclosure.

FIG. 2 is a block diagram for explaining the configuration of an electronic device according to an embodiment of the disclosure.

Referring to FIGS. 1 and 2, in an embodiment of the disclosure, the electronic device 100 may include the image display portion 110, a memory 120, at least one processor 130, a time of flight (ToF) sensor 141, an acceleration sensor 142, a gyro sensor 143, an optical sensor 150, a power portion 160, an input/output interface 170, a user interface 180, and a communication interface 190. However, the elements illustrated in FIG. 2 are not all essential elements.

In an embodiment of the disclosure, the electronic device 100 may be implemented with more elements than the number of the elements illustrated in FIG. 2, or with less elements than the number thereof. The image display portion 110, the memory 120, the at least one processor 130, the ToF sensor 141, the acceleration sensor 142, the gyro sensor 143, the optical sensor 150, the power portion 160, the input/output interface 170, the user interface 180, and the communication interface 190 may be respectively electrically and/or physically connected to one another.

In an embodiment of the disclosure, the image display portion 110, which is an element that generates light to display the content 200 and project the content 200 toward the space 300, may be referred to as a projection portion, a projecting unit, or the like. The image display portion 110 may include various detailed elements, such as a light source, a projection lens, a reflection body, and the like.

In an embodiment of the disclosure, the image display portion 110 may project the content 200 by generating light in various projection methods, for example, a cathode-ray tube (CRT) method, a liquid crystal display (LCD) method, a digital light processing (DLP) method, a laser method, and the like.

In an embodiment of the disclosure, the image display portion 110 may include various types of light sources. For example, the image display portion 110 may include at least one of light sources, such as a lamp, a light-emitting diode (LED), and a laser.

In an embodiment of the disclosure, the image display portion 110 may output the content 200 at 4:3 screen ratio, a 5:4 screen ratio, a 16:9 wide screen ratio, etc. depending on the purpose of the electronic device 100, the settings of the user 400, and the like, and output the content 200 at various resolutions, such as WVGA (854*480), SVGA (800*600), XGA (1024*768), WXGA (1180*720), WXGA (1180*800), SXGA (1180*1024), UXGA (1600*1100), Full HD (1920*1080), UHD (3840*2160), and the like, depending on the screen ratio.

In an embodiment of the disclosure, the memory 120 may store instructions, data structures, and program code that can be read by the at least one processor 130. In an embodiment of the disclosure, the memory 120 may include one or more memories. In the disclosed embodiment, the operations performed by the at least one processor 130 may be implemented by executing instructions or codes stored in the memory 120.

In an embodiment of the disclosure, the memory 120 may include at least one of a flash memory type, a hard disk type, a multimedia card micro type, a card type memory (e.g. SD or XD memory, etc.), random access memory (RAM) static random access memory (SRAM), read-only memory (ROM), electrically erasable programmable read-only memory (EEPROM), programmable read-only memory (PROM), mask ROM, flash ROM, a hard disk drive (HDD), or a solid state drive (SSD). The memory 120 may store instructions or program code to perform functions or operations of the electronic device 100. The instructions, algorithms, data structures, program code, and application programs stored in memory 120 may be implemented by, for example, programming or scripting languages, such as C, C++, Java, Assembler, etc.

In an embodiment of the disclosure, the memory 120 may store various types of modules that may be used to provide the content 200 to the user 400 by displaying the content 200 through the image display portion 110. The memory 120 may store an impact detection module 121, a calibration threshold value setting module 122, an impact amount comparison module 126, and an image display portion calibration module 127. In an embodiment of the disclosure, the calibration threshold value setting module 122 may include a content complexity determination module 123, an operation mode determination module 124, and an illuminance measurement module 125.

However, modules illustrated in FIG. 2 are not all essential modules. More modules than the number of the modules illustrated in FIG. 2 may be stored in the memory 120, or less modules than the number thereof may be stored in the memory 120.

In an embodiment of the disclosure, the module included in the memory 120 may refer to a unit that processes a function or operation performed by the at least one processor 130. The module included in the memory 120 may be implemented by software, such as instructions, algorithms, data structures, or program code.

In an embodiment of the disclosure, the impact detection module 121 may be configured with instructions or program code related to an operation or function to detect the external impact 500 applied to the electronic device 100 and calculate an amount of the external impact. In an embodiment of the disclosure, the at least one processor 130 may, by executing the instructions or program code of the impact detection module 121, detect the external impact 500 applied to the electronic device 100 by using the ToF sensor 141, the acceleration sensor 142 or the gyro sensor 143, and calculate an amount of the external impact.

In an embodiment of the disclosure, the calibration threshold value setting module 122 may be configured with instructions or program code related to an operation or function to set the calibration threshold value that determines whether to calibrate the image display portion 110. In an embodiment of the disclosure, the calibration threshold value setting module 122 may be configured with instructions or program code related to an operation or function to set the calibration threshold value based on the usage environment of the electronic device 100. In an embodiment of the disclosure, the calibration threshold value may be a reference value for the at least one processor 130 to determine whether to perform the calibration of the image display portion 110. In an embodiment of the disclosure, the at least one processor 130 may, by executing the instructions or program code of the calibration threshold value setting module 122, set the calibration threshold value based on the usage environment of the electronic device 100.

In an embodiment of the disclosure, the usage environment of the electronic device 100 may include the complexity of the content 200 displayed through the image display portion 110, the operation mode of the electronic device 100, and the illuminance of the space 300 including the electronic device 100. In an embodiment of the disclosure, the calibration threshold value setting module 122 may include the content complexity determination module 123, the operation mode determination module 124, and the illuminance measurement module 125.

In an embodiment of the disclosure, the content complexity determination module 123 may be configured with instructions or program code related to an operation or function to determine the complexity of the content 200 displayed through the image display portion 110. In an embodiment of the disclosure, the complexity of the content 200 may refer to a change of data included in the content 200 over time or according to a space. In an embodiment of the disclosure, the complexity of the content 200 may be determined based on a feature included in the content 200.

In an embodiment of the disclosure, when the content 200 is a still image that does not change during multiple frames, a change of the data included in the content 200 over time may be small. When the content 200 is a video that changes during multiple frames, the change of the data included in the content 200 over time may be great. In this case, the complexity when the content 200 is a video may be greater than the complexity when the content 200 is a still image.

In an embodiment of the disclosure, when a degree of change in the color of luminance of each of a plurality of pixels constituting the content 200 is great for each area in the content 200, a change of the data included in the content 200 according to a space may be great. When a degree of change in the color of luminance of each of a plurality of pixels constituting the content 200 is small for each area in the content 200, the change of the data included in the content 200 according to a space may be small. In this case, the complexity when a change in the color or luminance of each of the pixels is great for each area of the content 200 may be greater than the complexity when a change in the color or luminance of each of a plurality of pixels is small for each area of the content 200.

In an embodiment of the disclosure, the content complexity determination module 123 may be configured with instructions or program code related to an operation or function to determine the complexity of the content 200 based on whether the content 200 is a video or a still image. In an embodiment of the disclosure, the content complexity determination module 123 may be configured with instructions or program code related to an operation or function to determine whether the content 200 is a video or a still image by determining the presence or absence of a change in the data included in the content 200 during multiple frames, and may determine that the complexity of the content 200 is high when the content 200 is determined to be a video, and the complexity of the content 200 is low when the content 200 is determined to be a still image.

In an embodiment of the disclosure, the content complexity determination module 123 may be configured with instructions or program code related to an operation or function to determine the complexity of content, based on the resolution of the content 200. In an embodiment of the disclosure, the content complexity determination module 123 may be configured with instructions or program code related to an operation or function to determine that the higher the complexity of the content 200 is, the higher the resolution of the content 200 is, and the lower the complexity of the content 200 is, the lower the resolution of the content 200 is.

In an embodiment of the disclosure, the content complexity determination module 123 may be configured with instructions or program code related to an operation or function to determine the complexity of the content 200 based on the frequency component of the content 200. In an embodiment of the disclosure, the content complexity determination module 123 may be configured with instructions or program code related to an operation or function to determine that the complexity of the content 200 is high by determining that the higher a degree of a change in the color or luminance of each of the pixels constituting the content 200 is for each area in the content 200, the higher the frequency component of the content 200 is. In an embodiment of the disclosure, the content complexity determination module 123 may be configured with instructions or program code related to an operation or function to determine that the complexity of the content 200 is low by determining that the lower a degree in a change in the color or luminance of each of the pixels constituting the content 200 is for each area in the content 200, the lower the frequency component of the content 200 is.

In an embodiment of the disclosure, the content complexity determination module 123 may be configured with instructions or program code related to an operation or function to determine the complexity of the content 200 through an edge detection algorithm. In an embodiment of the disclosure, the content complexity determination module 123 may be configured with instructions or program code related to an operation or function to determine that the higher the complexity of the content 200 is, the more the number of detected edge components is. In an embodiment of the disclosure, the content complexity determination module 123 may be configured with instructions or program code related to an operation or function to determine that the lower the complexity of the content 200 is, the less the number of detected edge components is.

In an embodiment of the disclosure, the at least one processor 130 may, by executing the instructions or program code of the content complexity determination module 123, determine the complexity of the content 200. The at least one processor 130 may, by executing the instructions or program code of the content complexity determination module 123, obtain at least one of the type of the content 200, the resolution of the content 200, the frequency component of the content 200, or the edge components included in the content 200, and determine the complexity of the content 200 based on at least one of the type of the content 200, the resolution of the content 200, the frequency component of the content 200, or the edge components included in the content 200, which are obtained.

In an embodiment of the disclosure, the higher the complexity of the content 200 is, the higher the sensitivity of the user 400 to a change of the content 200 by the external impact 500 may be. In an embodiment of the disclosure, as the location of the electronic device 100, the distance between the image display portion 110 and the space 300, the angle between the image display portion 110 and the space 300, or the like are changed by the external impact 500, the content 200 being provided may be changed (e.g., the focus of the content 200 is changed or the content 200 is distorted in a horizontal direction or a vertical direction). In this state, the higher the complexity of the content 200 being provided is, the higher the sensitivity for a change of the content 200 perceived by the user 400 may be.

In an embodiment of the disclosure, the higher the sensitivity for a change of the content 200 perceived by the user 400 is, the at least one processor 130 may set the calibration threshold value to be smaller. In an embodiment of the disclosure, the lower the sensitivity for a change of the content 200 perceived by the user 400, the at least one processor 130 may set the calibration threshold value to be greater. When the calibration threshold value is set to be relatively small, the calibration of the image display portion 110 is performed even to a small size of the external impact 500, and thus the content 200 of high visibility may be provided to the user 400. When the calibration threshold value is set to be relatively large, the calibration of the image display portion 110 is not performed to a small size of the external impact 500, and the content 200 is continuously displayed so that the immersion of the user 400 using the electronic device 100 may not be disturbed.

In an embodiment of the disclosure, the at least one processor 130 may set the calibration threshold value based on the complexity of the content 200 that is determined.

In an embodiment of the disclosure, the operation mode determination module 124 may be configured with instructions or program code related to an operation or function to determine the operation mode of the electronic device 100. In an embodiment of the disclosure, the electronic device 100 may operate in a first mode in which the content 200 provided through the image display portion 110 is displayed as content in augmented reality or a second mode in which the content 200 is displayed as content in a real world. The operation mode determination module 124 may be configured with instructions or program code related to an operation or function to determine whether the electronic device 100 operates in the first mode or the second mode.

In an embodiment of the disclosure, the operation mode determination module 124 may be configured with instructions or program code related to an operation or function to determine that the electronic device 100 operates in the first mode when the electronic device 100 is connected to a nearby head mounted display (HMD) device through the communication interface 190. In an embodiment of the disclosure, the operation mode determination module 124 may be configured with instructions or program code related to an operation or function to determine that the electronic device 100 operates in the second mode when the electronic device 100 is not connected to a nearby head mounted display device.

In an embodiment of the disclosure, a nearby head mounted display device may be worn by the user 400. The head mounted display device may be an optical see-through display device that provides the user 400 with a virtual image by overlaying the virtual image over a physical environment space of the real world, or a real world object. In this state, the content 200 provided by the electronic device 100 may be provided to the user 400 as a virtual image.

In an embodiment of the disclosure, the at least one processor 130 may, by executing the instructions or program code of the operation mode determination module 124, determine the operation mode of the electronic device 100. The at least one processor 130 may, by executing the instructions or program code of the operation mode determination module 124, determine in which of the first mode and the second mode the electronic device 100 operates.

In an embodiment of the disclosure, the at least one processor 130 may set the calibration threshold value according to the operation mode of the electronic device 100 determined through the operation mode determination module 124. As the electronic device 100 is determined to operate in the first mode through the operation mode determination module 124, the at least one processor 130 may set the calibration threshold value to a first value. As the electronic device 100 is determined to operate in the second mode through the operation mode determination module 124, the at least one processor 130 may set the calibration threshold value to a second value. In this state, the first value and the second value may be different from each other. In an embodiment of the disclosure, the first value may be less than the second value. The first mode, the second mode, the first value, and the second value are described later with reference to FIGS. 6 and 7.

In an embodiment of the disclosure, the illuminance measurement module 125 may be configured with instructions or program code related to an operation or function to measure the illuminance of the space 300 including the electronic device 100, by using the optical sensor 150. In an embodiment of the disclosure, the at least one processor 130 may, by executing the instructions or program code of the illuminance measurement module 125, measure the illuminance of the space 300 including the electronic device 100.

In an embodiment of the disclosure, the at least one processor 130 may set the calibration threshold value based on the illuminance of the space 300 measured through the illuminance measurement module 125. In an embodiment of the disclosure, the at least one processor 130 may set the magnitude of the calibration threshold value to be greater as the measured illuminance of the space 300 increases. Hereinafter, the measured illuminance and the calibration threshold value are described below with reference to FIGS. 9 and 10.

In an embodiment of the disclosure, the impact amount comparison module 126 may be configured with instructions or program code related to an operation or function to compare the amount of the external impact calculated through the impact detection module 121 and the magnitude of the calibration threshold value set through the calibration threshold value setting module 122. In an embodiment of the disclosure, the at least one processor 130 may, by executing the instructions or program code of the impact amount comparison module 126, compare the calculated amount of the external impact with the set magnitude of the calibration threshold value.

In an embodiment of the disclosure, the image display portion calibration module 127 may be configured with instructions or program code related to an operation or function to perform the calibration of the image display portion 110 when the amount of the external impact is determined to be greater than the calibration threshold value through the impact amount comparison module 126. In an embodiment of the disclosure, calibration of the image display portion 110 may include at least one of keystone correction or focus adjustment. In an embodiment of the disclosure, the image display portion calibration module 127 may perform at least one of the keystone correction or the focus adjustment when the amount of the external impact is determined to be greater than the calibration threshold value. However, the disclosure is not limited thereto, and the calibration of the image display portion 110 may further include calibration to clearly display the content 200 in the space 300 and display the content 200 in a desired shape.

In an embodiment of the disclosure, the at least one processor 130 may, by executing the instructions or program code of the image display portion calibration module 127, perform the calibration of the image display portion 110 as the amount of the external impact is determined to be greater than the calibration threshold value. In an embodiment of the disclosure, the at least one processor 130 may perform at least one of the keystone correction or the focus adjustment as the amount of the external impact is determined to be greater than the calibration threshold value the image display portion 110.

In an embodiment of the disclosure, the at least one processor 130 may include at least one of CPUs, microprocessors, graphic processing units (GPUs), application processors (APs), application specific integrated circuits (ASICs), digital signal processors (DSPs), digital signal processing devices (DSPDs), programmable logic devices (PLDs), field programmable gate arrays (FPGAs), neural processor units (NPUs), or artificial intelligence dedicated processors designed with a hardware structure especially for training and processing of an artificial intelligence (AI) model, but the disclosure is not limited thereto.

In an embodiment of the disclosure, the at least one processor 130 may execute various types of modules stored in the memory 120. In an embodiment of the disclosure, the at least one processor 130 may execute the impact detection module 121, the content complexity determination module 123, the operation mode determination module 124, the illuminance measurement module 125, the impact amount comparison module 126, and the image display portion calibration module 127, which are stored in the memory 120. In an embodiment of the disclosure, the at least one processor 130 may execute at least one of instructions constituting various types of the modules stored in the memory 120.

In an embodiment of the disclosure, the ToF sensor 141 may measure a distance between the electronic device 100 and the space 300 for displaying the content 200. In an embodiment of the disclosure, the ToF sensor 141 may measure a distance between the image display portion 110 displaying the content 200 and an area of the space 300 in which the content 200 is provided. In an embodiment of the disclosure, the ToF sensor 141 may include a light source for irradiating light and a light receiving portion for receiving reflected light that is reflected light of the irradiated light. In an embodiment of the disclosure, the ToF sensor 141 may include an infrared LED that emits infrared light. The ToF sensor 141 may include a detector (e.g., photodiode) capable of receiving the infrared light reflected from the space 300. The ToF sensor 141 may measure the distance between the image display portion 110 and the space 300 based on the time for the irradiated light to be reflected and received. However, the disclosure is not limited thereto, and the ToF sensor 141 may include various configurations to measure the distance between the image display portion 110 and the space 300.

In an embodiment of the disclosure, the acceleration sensor 142 may measure the acceleration of the electronic device 100. In an embodiment of the disclosure, the acceleration sensor 142 may measure the acceleration of the electronic device 100 by measuring a change in the resistance or capacitance of the acceleration sensor 142. In an embodiment of the disclosure, the acceleration sensor 142 may measure the acceleration of the electronic device 100 by measuring electric charges generated by a deformation due to mechanical vibrations or an impact. However, the disclosure is not limited thereto, and the acceleration sensor 142 may include various configurations for measuring the acceleration of the electronic device 100.

In an embodiment of the disclosure, the gyro sensor 143 may measure the angular velocity of the electronic device 100. In an embodiment of the disclosure, the gyro sensor 143 may measure the angular velocity of the electronic device 100 by detecting the rotation of the electronic device 100 and measuring a change in the resistance or capacitance according to the rotation of the electronic device 100. However, the disclosure is not limited thereto, and the gyro sensor 143 may include various configurations to measure the angular velocity of the electronic device 100.

In an embodiment of the disclosure, the optical sensor 150 may sense light provided to the electronic device 100. The optical sensor 150 may measure the illuminance of the space 300 where the electronic device 100 is located. In an embodiment of the disclosure, the optical sensor 150 may include a photodiode, phototransistor, and the like. However, the disclosure is not limited thereto, and the optical sensor 150 may include various configurations to measure the illuminance of the space 300 including the electronic device 100.

In an embodiment of the disclosure, the power portion 160 may provide power to the electronic device 100 under the control of the at least one processor 130. In an embodiment of the disclosure, the power portion 160 may be connected to an external power device and may receive power from the external power device and transfer the power to the electronic device 100. In an embodiment of the disclosure, the power portion 160 may be charged with the power supplied from the external power device and may transfer the charged power to the electronic device 100. In an embodiment of the disclosure, the power portion 160 may deliver pre-charged power to the electronic device 100 even when not connected to the external power device. In an embodiment of the disclosure, the power portion 160 may include a battery.

In an embodiment of the disclosure, the input/output interface 170 may perform input/output operations of image data with an external server or another nearby electronic device, under the control of the at least one processor 130. In an embodiment of the disclosure, the at least one processor 130 may receive image data from an external server or another nearby electronic device through the input/output interface 170. In an embodiment of the disclosure, the input/output interface 170 may perform input/output operations of image data with an external server or another nearby electronic device by using at least one of input/output methods including a high-definition multimedia interface (HDMI), a digital visual interface (DVI), and a universal serial bus (USB). However, the disclosure is not limited to the input/output method described above. Furthermore, the input/output interface 170 may perform input/output operations of voice data from an external server or external electronic device, under the control of the at least one processor 130. In an embodiment of the disclosure, the at least one processor 130 may generate the content 200 based on the image data and the voice data.

In an embodiment of the disclosure, the user interface 180 may receive an input from the user 400 using the electronic device 100, under the control of the at least one processor 130. In an embodiment of the disclosure, the user interface 180 may include a touch portion, a push button, a voice recognition portion, a gesture recognition portion, and the like. In an embodiment of the disclosure, the electronic device 100 may obtain a user input provided by a user through the user interface 180. In an embodiment of the disclosure, the electronic device 100 may obtain a user input from a user who touches or presses the user interface 180, provides voice, makes gestures using a hand or the like.

In an embodiment of the disclosure, the user 400 may provide, through the user interface 180, a user input to select the first mode in which the electronic device 100 displays the content 200 as content in augmented reality or the second mode in which the electronic device 100 displays the content 200 as content in real world In an embodiment of the disclosure, the user 400 may provide, through the user interface 180, a selection signal including information for selecting not to perform the calibration of the image display portion 110. Furthermore, the user 400 may provide an input signal provided for the content 200 through the user interface 180.

In an embodiment of the disclosure, the communication interface 190 may perform data communication with an external server, under the control of the at least one processor 130. Furthermore, the communication interface 190 may perform data communication not only with an external server, but also with another nearby electronic device. The communication interface 190 may perform data communication with a server or another nearby electronic devices by using at least one of data communication methods, for example, a wired local area network (LAN), a wireless LAN, Wi-Fi, Bluetooth, Zigbee, Wi-Fi direct (WFD), infrared communication such as infrared data association (IrDA), Bluetooth low energy (BLE), near field communication (NFC), wireless broadband internet (Wibro), world interoperability for microwave access (WiMAX), shared wireless access protocol (SWAP), wireless gigabit alliance (WiGig) and radio frequency (RF) communication.

Figure 3:
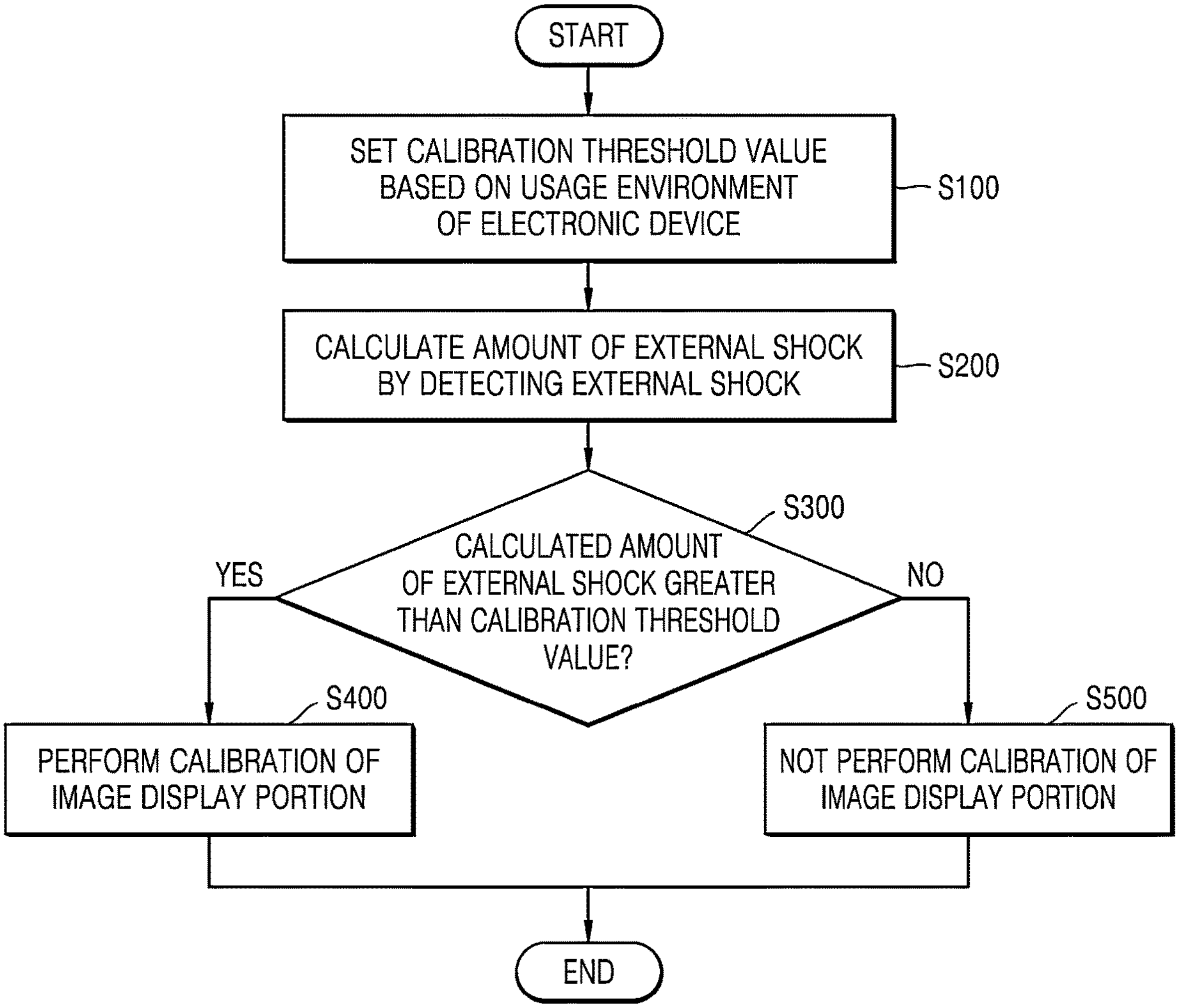
FIG. 3 is a flowchart for explaining operation of an electronic device according to an embodiment of the disclosure.

FIG. 3 is a flowchart for explaining the operation of an electronic device according to an embodiment of the disclosure.

Referring to FIGS. 1, 2, and 3, in an embodiment of the disclosure, the operating method of the electronic device 100 may include setting a calibration threshold value that determines whether to calibrate the image display portion 110 that displays the content 200, based on the usage environment of the electronic device 100 (S100). In an embodiment of the disclosure, in the setting of the calibration threshold value (S100), the at least one processor 130 may, by executing the instructions or program code of the calibration threshold value setting module 122, set the calibration threshold value. The at least one processor 130 may set the calibration threshold value based on the usage environment of the electronic device 100 through the calibration threshold value setting module 122 and at least one of the content complexity determination module 123, the operation mode determination module 124, or the illuminance measurement module 125 included in the calibration threshold value setting module 122.

In an embodiment of the disclosure, the operating method of the electronic device 100 may include calculating an amount of the external impact by detecting the external impact 500 applied to the electronic device 100 (S200). In an embodiment of the disclosure, in the calculating of the amount of the external impact by detecting the external impact 500 (S200), the at least one processor 130 may, by executing the instructions or program code of the impact detection module 121, detect the external impact 500 applied to the electronic device 100 and calculate an amount of the external impact.

However, the disclosure is not limited thereto, and the setting of the calibration threshold value (S100) and the calculating of the amount of the external impact (S200) may be simultaneously performed, or the calculating of the amount of the external impact (S200) may be first performed.

In an embodiment of the disclosure, the operating method of the electronic device 100 may include the comparing of the calculated amount of the external impact with the magnitude of the calibration threshold value (S300). In an embodiment of the disclosure, in the comparing of the calculated amount of the external impact with the magnitude of the calibration threshold value (S300), the at least one processor 130 may, by executing the instructions or program code of the impact amount comparison module 126, compare the amount of the external impact with the magnitude of the calibration threshold value and determine whether the magnitude of the calculated amount of the external impact is greater than the magnitude of the calibration threshold value.

In an embodiment of the disclosure, the operating method of the electronic device 100 may include performing a calibration of the image display portion 110 (S400) as the amount of the external impact is determined to be greater than the calibration threshold value in the comparing of the amount of the external impact with the magnitude of the calibration threshold value (S300). In an embodiment of the disclosure, in the performing of a calibration of the image display portion 110 (S400), the at least one processor 130 may, by executing the instructions or program code of the image display portion calibration module 127, perform the calibration of the image display portion 110 as the amount of the external impact is determined to be greater than the calibration threshold value.

In an embodiment of the disclosure, the operating method of the electronic device 100 may include non-performing of the calibration of the image display portion 110 (S500) as the amount of the external impact is determined to be less than or equal to the calibration threshold value in the comparing of the amount of the external impact with the magnitude of the calibration threshold value (S300). In an embodiment of the disclosure, in the non-performing of the calibration of the image display portion 110 (S500), the at least one processor 130 may not perform the calibration of the image display portion 110 as the amount of the external impact is determined to be less than or equal to the calibration threshold value.

In an embodiment of the disclosure, when the external impact 500 is not applied to the electronic device 100, or even the external impact 500 is applied to the electronic device 100, but the calculated amount of the external impact is not greater than the calibration threshold value, the calibration of the image display portion 110 may not be performed. Accordingly, a sensitivity of performing calibration of the image display portion 110 in response to the external impact 500 may be adjusted by increasing or decreasing the magnitude of the calibration threshold value that is set.

In an embodiment of the disclosure, the non-performing of calibration of an image display portion may mean stopping an operation of performing calibration of an image display portion.

Figure 4:
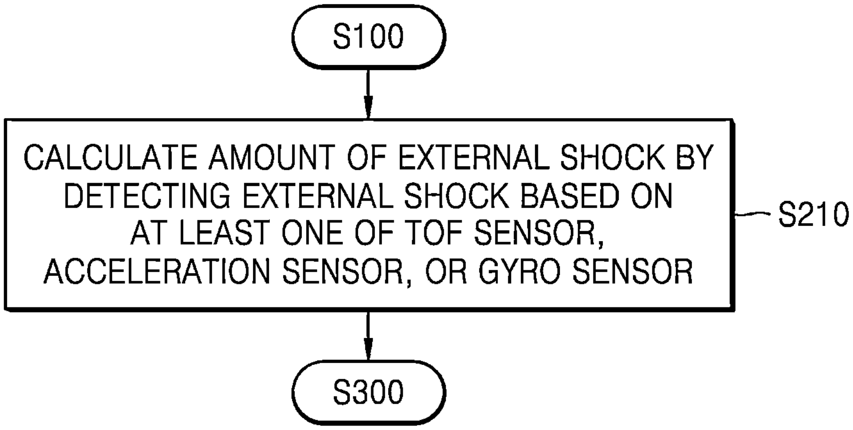
FIG. 4 is a flowchart for explaining an operation of detecting an impact and calculating an amount of an external impact, according to an embodiment of the disclosure.

FIG. 4 is a flowchart for explaining an operation of detecting an impact and calculating an amount of the external impact, according to an embodiment of the disclosure. Hereinafter, like reference numerals are assigned to like operations same as those described in FIG. 3, and redundant descriptions thereof are omitted Referring to FIGS. 2, 3, and 4, in an embodiment of the disclosure, in the calculating of the amount of the external impact by detecting the external impact 500 applied to the electronic device 100 (S200), the external impact 500 may be detected based on at least one of the ToF sensor 141, the acceleration sensor 142, or the gyro sensor 143 and the amount of the external impact may be calculated (S210).

In an embodiment of the disclosure, in the calculating of the amount of the external impact by detecting the external impact 500 (S200), the at least one processor 130 may, by executing the instructions or program code of the impact detection module 121, may detect the external impact 500 applied to the electronic device 100 by using at least one sensor of the ToF sensor 141, the acceleration sensor 142, or the gyro sensor 143, and calculated the amount of the external impact.

In an embodiment of the disclosure, the operating method of the electronic device 100 may include, after the setting of the calibration threshold value (S100), calculating the amount of the external impact by detecting the external impact 500 based on at least one of the ToF sensor 141, the acceleration sensor 142, or the gyro sensor 143 (S210). In an embodiment of the disclosure, after the calculating of the amount of the external impact (S210), the comparing of the calculated amount of the external impact with the magnitude of the calibration threshold value (S300) may be performed.

Figure 5:
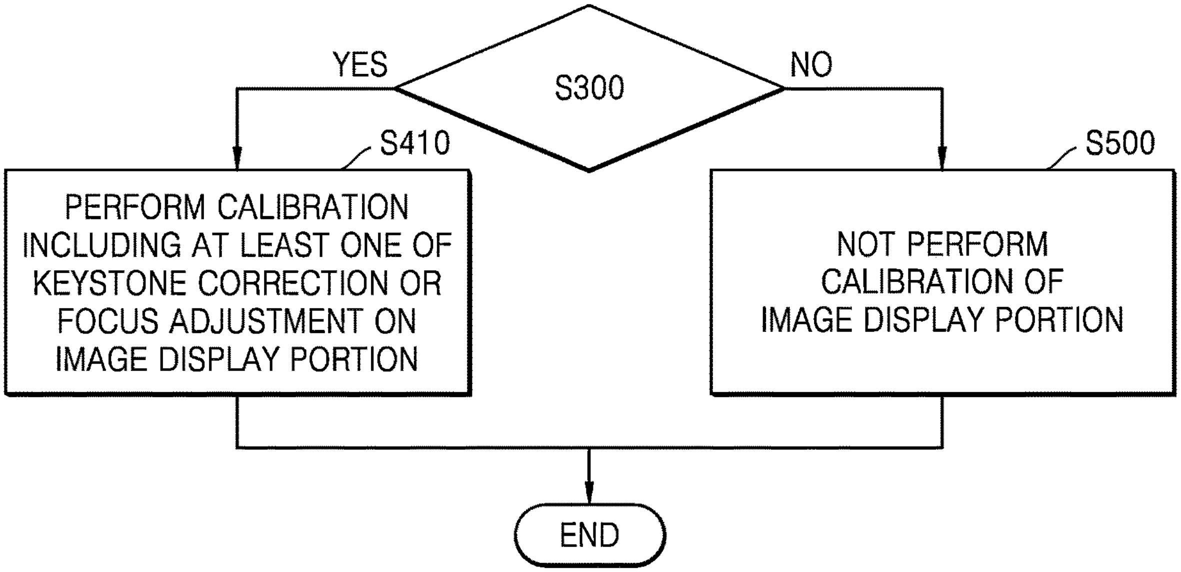
FIG. 5 is a flowchart for explaining an operation of performing calibration of an image display portion, according to an embodiment of the disclosure.

FIG. 5 is a flowchart for explaining an operation of performing calibration of an image display portion, according to an embodiment of the disclosure. Hereinafter, like reference numerals are assigned to like operations same as those described in FIG. 3, and redundant descriptions thereof are omitted.

Referring to FIGS. 2, 3, and 5, in an embodiment of the disclosure, as the amount of the external impact is determined to be greater than the calibration threshold value in the comparing of the amount of the external impact with the magnitude of the calibration threshold value (S300), in the performing of a calibration of the image display portion 110 (S400), calibration including at least one of the keystone correction or the focus adjustment of the image display portion 110 may be performed (S410).

In an embodiment of the disclosure, in the performing of a calibration of the image display portion 110 (S400), the at least one processor 130 may, by executing the instructions or program code of the image display portion calibration module 127, may perform at least one of the keystone correction or the focus adjustment of the image display portion 110. However, the disclosure is not limited thereto, and the at least one processor 130 may perform the calibration of the image display portion 110 in a different method to clearly display the content 200 in the space 300 and display the content 200 in a desired shape.

In an embodiment of the disclosure, as the amount of the external impact is determined to be not greater than the calibration threshold value in the comparing of the amount of the external impact with the magnitude of the calibration threshold value (S300), the at least one processor 130 may not perform the calibration of the image display portion 110 (S500).

Figure 6:
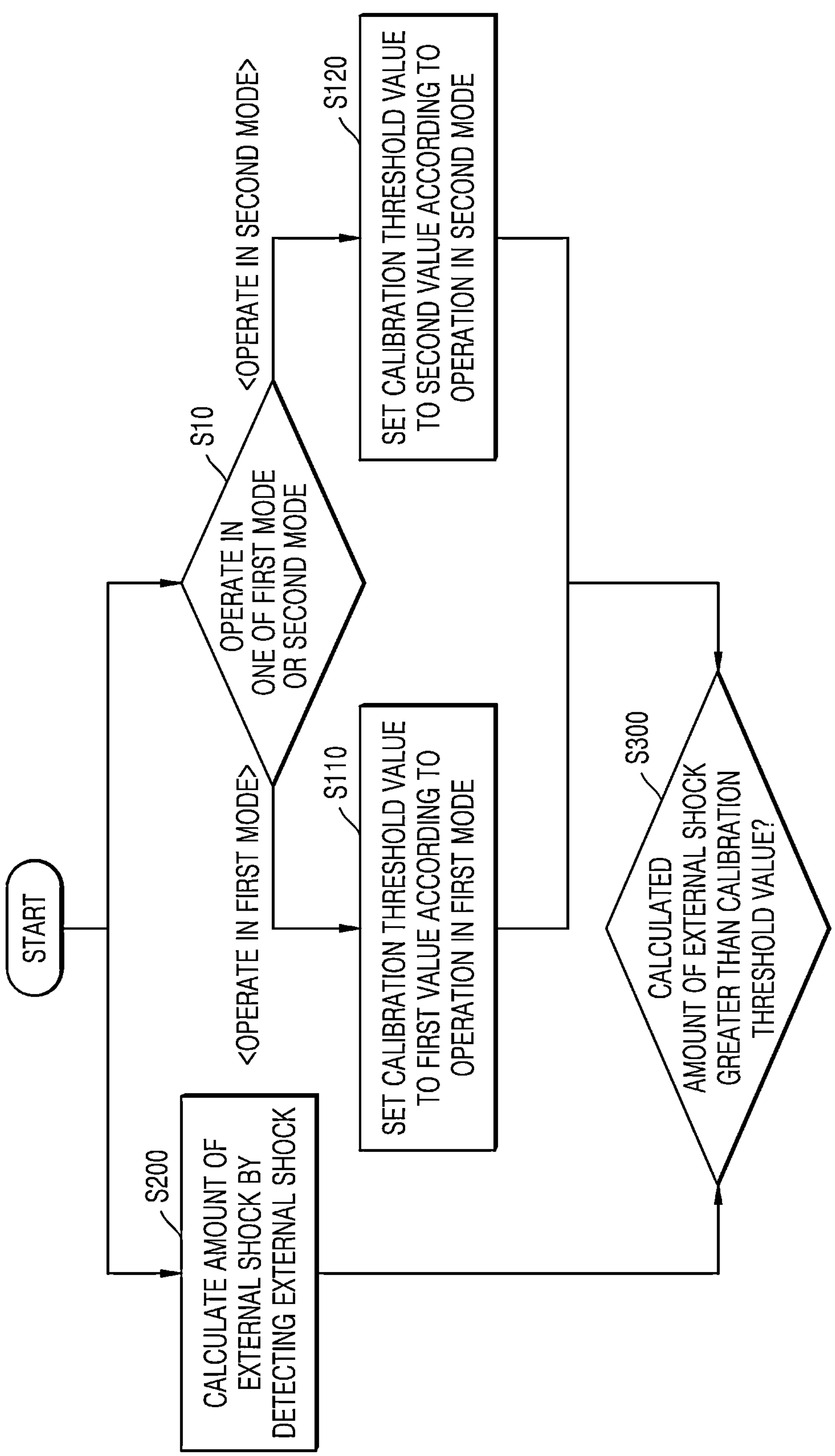
FIG. 6 is a flowchart for explaining an operation of setting a calibration threshold value according to an operation mode of an electronic device, according to an embodiment of the disclosure.
Figure 7:
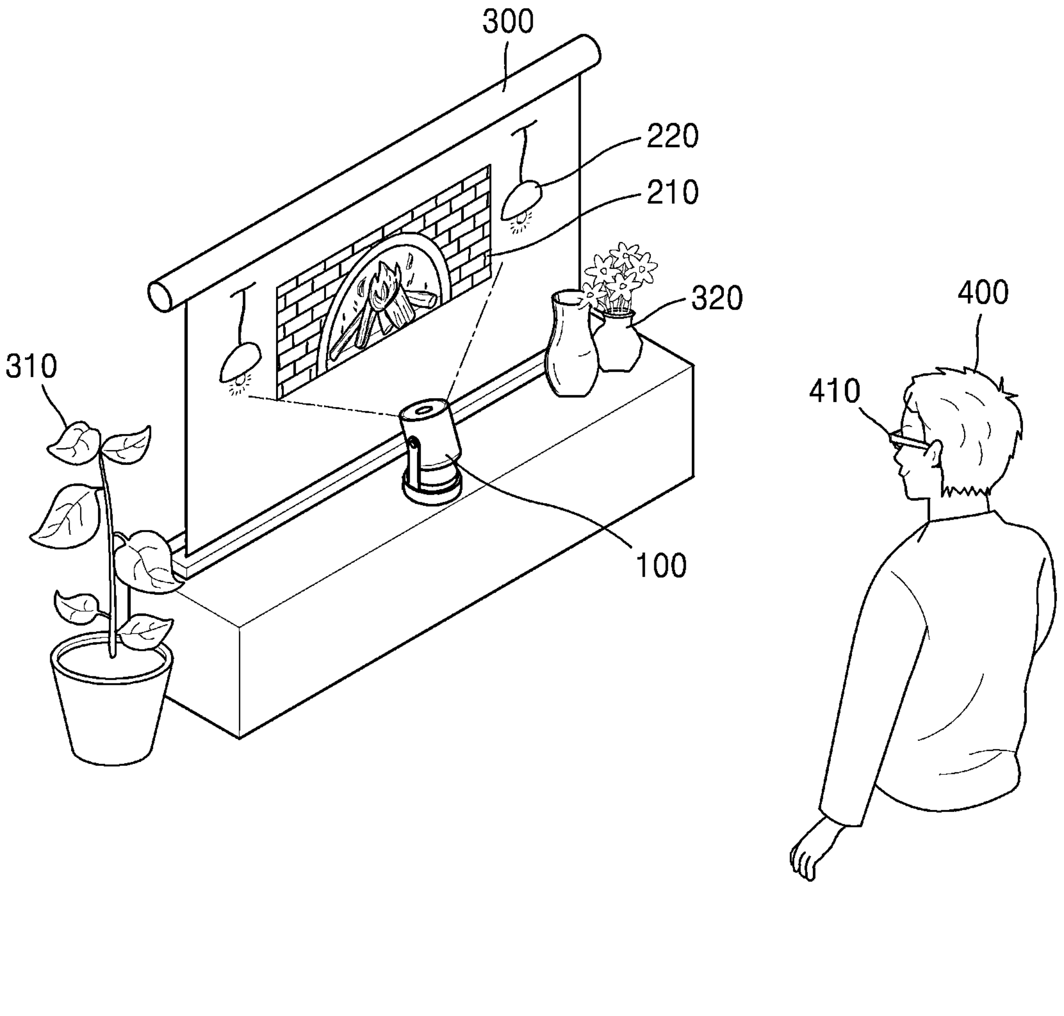
FIG. 7 is a view for explaining an operation in a first mode of an electronic device that displays content as content in augmented reality, according to an embodiment of the disclosure.

FIG. 6 is a flowchart for explaining an operation of setting a calibration threshold value according to an operation mode of the electronic device 100 according to an embodiment of the disclosure. FIG. 7 is a view for explaining an operation in the first mode of the electronic device 100 that displays the content 200 as content in augmented reality, according to an embodiment of the disclosure. Hereinafter, like reference numerals are assigned to like configurations and operations that are the same as those described in FIGS. 1 and 3, and redundant descriptions thereof are omitted.

Referring to FIGS. 1, 2, 3, and 6, in an embodiment of the disclosure, the operating method of the electronic device 100 may include determining in which of the first mode in which the content 200 provided through the image display portion 110 is displayed as content in augmented reality and the second mode in which the content 200 is displayed as content in real world the electronic device 100 operates (S10).

In an embodiment of the disclosure, in the determining of the operation in the first mode or the second mode (S10), the at least one processor 130 may, by executing the instructions or program code of the operation mode determination module 124, determine in which of the first mode and the second mode the electronic device 100 operates.

In an embodiment of the disclosure, when the electronic device 100 is determined to be connected, through the communication interface 190, to an external electronic device, such as, a head mounted display and the like, that provides the user 400 with content in augmented reality, the at least one processor 130 may determine that the electronic device 100 operates in the first mode. In an embodiment of the disclosure, when the electronic device 100 is not determined to be connected to an external electronic device that provides the user 400 with content in augmented reality, the at least one processor 130 may determine that the electronic device 100 operates in the second mode.

However, the disclosure is not limited thereto, and when the at least one processor 130 obtains a user input including information to operate in the first mode or the second mode through the user interface 180, the at least one processor 130 may determine that the electronic device 100 operates in the first mode or the second mode based on the obtained user input.

In an embodiment of the disclosure, as the electronic device 100 is determined to operate in the first mode in the determining of the operation the first mode or the second mode (S10), in the setting of the calibration threshold value (S100), the calibration threshold value may be set to be a first value (S110). In an embodiment of the disclosure, as the electronic device 100 is determined to operate in the second mode in the determining of the operation in the first mode or the second mode (S10), in the setting of the calibration threshold value (S100), the calibration threshold value may be set to a second value (S120).

Referring to FIGS. 1, 2, 6, and 7, in an embodiment of the disclosure, FIG. 7 illustrates a case in which the electronic device 100 operates in the first mode, the contents 210 and 220 provided from the electronic device 100 are displayed as contents in in augmented reality. In an embodiment of the disclosure, although FIG. 7 illustrates the electronic device 100 in a cylindrical shape, the disclosure is not limited thereto, and the electronic device 100 may have various shapes.

In an embodiment of the disclosure, the electronic device 100 may be connected to a head mounted display device 410 nearby through the communication interface 190. In an embodiment of the disclosure, the user 400 may be in a state of wearing the head mounted display device 410. The user 400 may see, through the head mounted display device 410, the space 300 including the electronic device 100, which is real world, and objects 310 and 320 in the space 300. The user 400 may see, through the head mounted display device 410, the contents 210 and 220 displayed by the electronic device 100 to be overlaid on the space 300.

In an embodiment of the disclosure, FIG. 7 illustrates that the objects 310 and 320 located in the space 300 including the electronic device 100 include the flower pot 310 and the ceramic 320, respectively. The contents 210 and 220 displayed by the electronic device 100 are illustrated as including the fireplace 210 and the lamp 220. The user 400 may see, through the head mounted display device 410, the fireplace 210 and the lamp 220 overlaid on the space 300, with the flower pot 310 and the ceramic 320 located in the space 300. In an embodiment of the disclosure, the contents 210 and 220 may each be a still image or an image with low complexity.

In an embodiment of the disclosure, the electronic device 100 may obtain, through the communication interface 190, a user input being sensed by the head mounted display device 410 for the fireplace 210 and the lamp 220 displayed to be overlaid on the space 300 through the head mounted display device 410. In an embodiment of the disclosure, the head mounted display device 410 may sense, through a camera and the like, an input of the user 400 to control, by using a hand and the like, the fireplace 210 and the lamp 220 displayed to be overlaid on the space 300, and provide the sensed user input to the electronic device 100. Furthermore, the head mounted display device 410 may obtain, through a separate touch portion or button and the like, a user input for the fireplace 210 and the lamp 220 displayed to be overlaid on the space 300.

However, the disclosure is not limited thereto. While wearing general glasses, not an electronic device such as the head mounted display device 410, or not wearing glasses, the user 400 may see the fireplace 210 and the lamp 220 overlaid on the space 300, with the flower pot 310 and the ceramic 320 located in the space 300. In this case, the user 400 may provide a user input to operate in the first mode through the user interface 180 of the electronic device 100.

In an embodiment of the disclosure, when the electronic device 100 operates in the first mode, the content 200 provided by the electronic device 100 may be overlaid with the objects 310 and 320 included in the space 300 and may be provided to the user 400. In this case, as the user 400 sees all of the objects 310 and 320 included in the space 300 and the content 200, a level of immersion in the content 200 may be lower than a case in which the electronic device 100 operates in the second mode. Accordingly, the sensitivity of the user 400 to a change in the content 200 according to the external impact 500 when the electronic device 100 operates in the first mode may be greater than the sensitivity of the user 400 to a change in the content 200 according to the external impact 500 when the electronic device 100 operates in the second mode.

Accordingly, the at least one processor 130 may set the calibration threshold value when the electronic device 100 operates in the first mode to be greater than the calibration threshold value when the electronic device 100 operates in the second mode. Accordingly, the first values set in the setting of the calibration threshold value to the first value (S210) may be less than the second value set in the setting of the calibration threshold value to the second value (S220).

However, the disclosure is not limited thereto. Even when the electronic device 100 operates in the first mode, when a level of immersion by the user 400 to content is high depending on a type of the content provided by the electronic device 100, the first value may be set to be the same as the second value. In an embodiment of the disclosure, when a level of immersion of the user 400 to content is high as the type of content is a video, a game, a notification, and the like, the at least one processor 130 may set the first value to be the same as the second value.

Referring back to FIG. 6, in an embodiment of the disclosure, the operating method of the electronic device 100 may include the amount of the external impact calculated in the calculating of the amount of the external impact by detecting the external impact 500 (S200) with the calibration threshold value set to the first value or the second value according to the operation mode of the electronic device 100 (S300).

In an embodiment of the disclosure, although FIG. 6 illustrates that the determining of the operation mode of the electronic device 100 (S10) and the setting of the calibration threshold value to the first value or the second value according to an operation mode (S110 and S120) are simultaneously performed with the calculating of the amount of the external impact (S200), the disclosure is not limited thereto, and the order of performing the operations may be changed.

Figure 8:
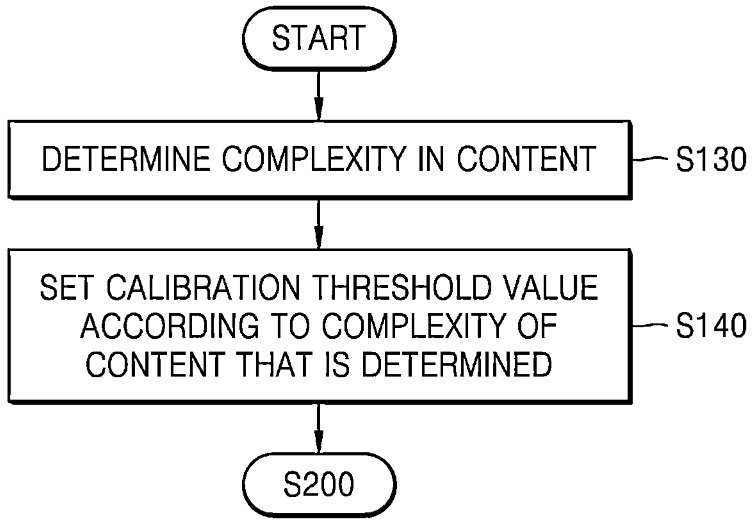
FIG. 8 is a flowchart for explaining an operation of setting a calibration threshold value depending on the complexity of content, according to an embodiment of the disclosure.

FIG. 8 is a flowchart for explaining an operation of setting a calibration threshold value depending on complexity of content, according to an embodiment of the disclosure. Hereinafter, like reference numerals are assigned to like operations same as those described in FIG. 3, and redundant descriptions thereof are omitted.

Referring to FIGS. 1, 2, 3, and 8, in an embodiment of the disclosure, the operating method of the electronic device 100 may include determining the complexity in the content 200 (S130). In an embodiment of the disclosure, in the determining of the complexity in the content 200 (S130), the at least one processor 130 may, by executing the instructions or program code of the content complexity determination module 123, determine the complexity in the content 200. In an embodiment of the disclosure, the at least one processor 130 may, by executing the instructions or program code of the content complexity determination module 123, determine the complexity of the content 200 based on at least one of the edge components included in the content 200, the resolution of the content 200, the frequency component of the content 200, or the type of the content 200.

In an embodiment of the disclosure, in the setting of the calibration threshold value (S100), the calibration threshold value may be set according to the complexity of the content 200 that is determined (S140). In an embodiment of the disclosure, the at least one processor 130 may, by executing the instructions or program code of the calibration threshold value setting module 122, set the calibration threshold value according to the complexity of the content 200.

In an embodiment of the disclosure, in the comparing of the amount of the external impact with the calibration threshold value (S300), the amount of the external impact calculated according to the external impact 500 and the calibration threshold value set according to the complexity of the content 200 may be compared with each other.

Figure 9:
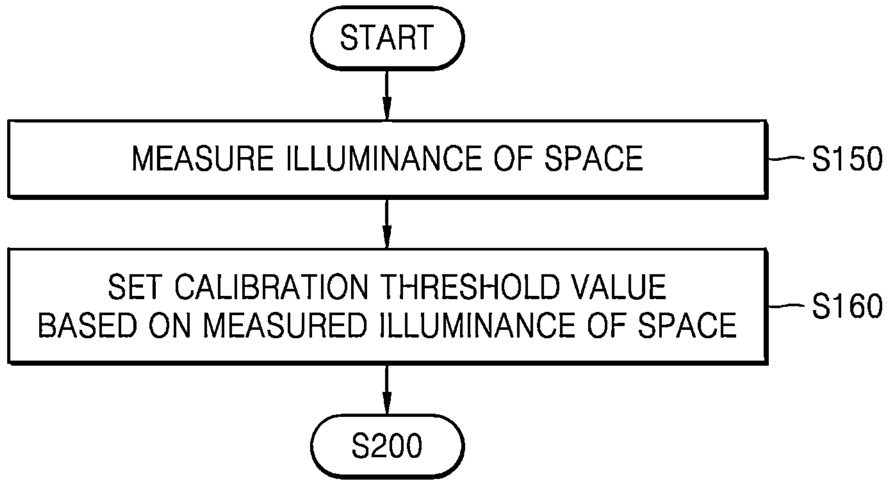
FIG. 9 is a flowchart for explaining an operation of setting a calibration threshold value depending on the illuminance of a space, according to an embodiment of the disclosure.
Figure 10:
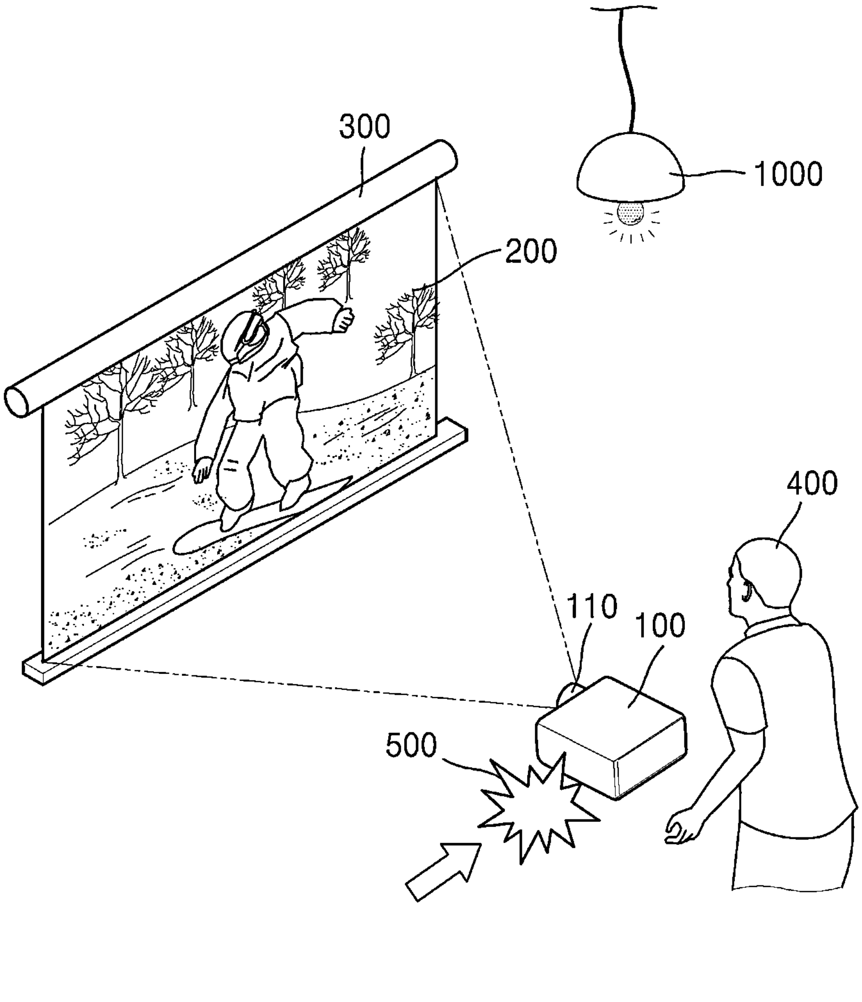
FIG. 10 is a view for explaining the operation of setting a calibration threshold value depending on the illuminance of a space, according to an embodiment of the disclosure.

FIG. 9 is a flowchart for explaining an operation of setting a calibration threshold value depending on illuminance of the space 300, according to an embodiment of the disclosure. FIG. 10 is a view for explaining the operation of setting a calibration threshold value depending on illuminance of the space 300, according to an embodiment of the disclosure. Hereinafter, like reference numerals are assigned to like configurations and operations that are the same as those described in FIGS. 1 and 3, and redundant descriptions thereof are omitted.

Referring to FIGS. 1, 2, 3, and 9, in an embodiment of the disclosure, the operating method of the electronic device 100 may include measuring the illuminance of the space 300 including the electronic device 100 (S150). In an embodiment of the disclosure, in the measuring of the illuminance of the space 300 (S150), the at least one processor 130 may, by executing the instructions or program code of the illuminance measurement module 125, measure the illuminance of the space 300 by using the optical sensor 150.

Referring to FIGS. 1, 9, and 10, in an embodiment of the disclosure, FIG. 10 illustrates a light 1000 arranged in the space 300 including the electronic device 100. In an embodiment of the disclosure, the light 1000 for providing light may be separately located in the surrounding environment of the electronic device 100. Although FIG. 10 illustrates the light 1000, the disclosure is not limited thereto. A television displaying an image and the like may be located in the surrounding environment of the electronic device 100. Furthermore, although FIG. 10 illustrates one light 1000, two or more lights may be located within the space 300.

In an embodiment of the disclosure, when the light 1000 is located near the electronic device 100, the visibility of the content 200 provided to the space 300 may vary. In an embodiment of the disclosure, when the illuminance of the space 300 increases as luminance of the light 1000 is high, the visibility of the content 200 provided by the electronic device 100 may decrease. Accordingly, the sensitivity of the user 400 to a change in the content 200 according to the external impact 500 may be lowered. In contrast, when the illuminance of the space 300 increases as the luminance of the light 1000 is low, the visibility of the content 200 provided by the electronic device 100 may be increased. Accordingly, the sensitivity of the user 400 to a change in the content 200 according to the external impact 500 may be increased.

In an embodiment of the disclosure, in the setting of the calibration threshold value (S100), the calibration threshold value may be set based on the measured illuminance of the space 300 (S160). In an embodiment of the disclosure, the at least one processor 130 may, by executing the instructions or program code of the calibration threshold value setting module 122, set the calibration threshold value based on the measured illuminance of the space 300. In an embodiment of the disclosure, the at least one processor 130 may set the calibration threshold value based on the magnitude of the illuminance of the space 300 that is measured. In an embodiment of the disclosure, the at least one processor 130 may set the magnitude of the calibration threshold value to be greater as the measured illuminance of the space 300 increases.

Figure 11:
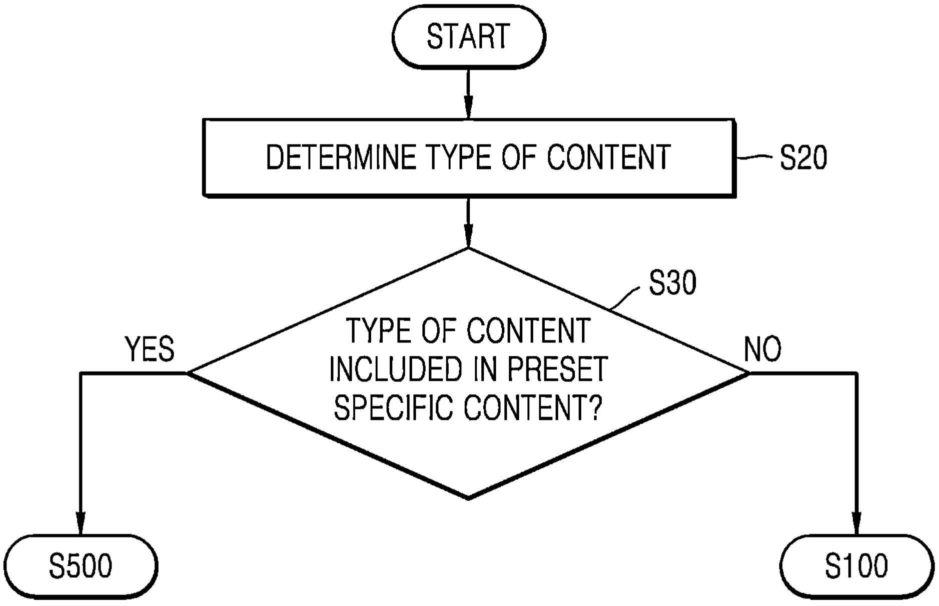
FIG. 11 is a flowchart for explaining an operation of determining whether to perform calibration of an image display portion depending on a type of content, according to an embodiment of the disclosure.
Figure 12:
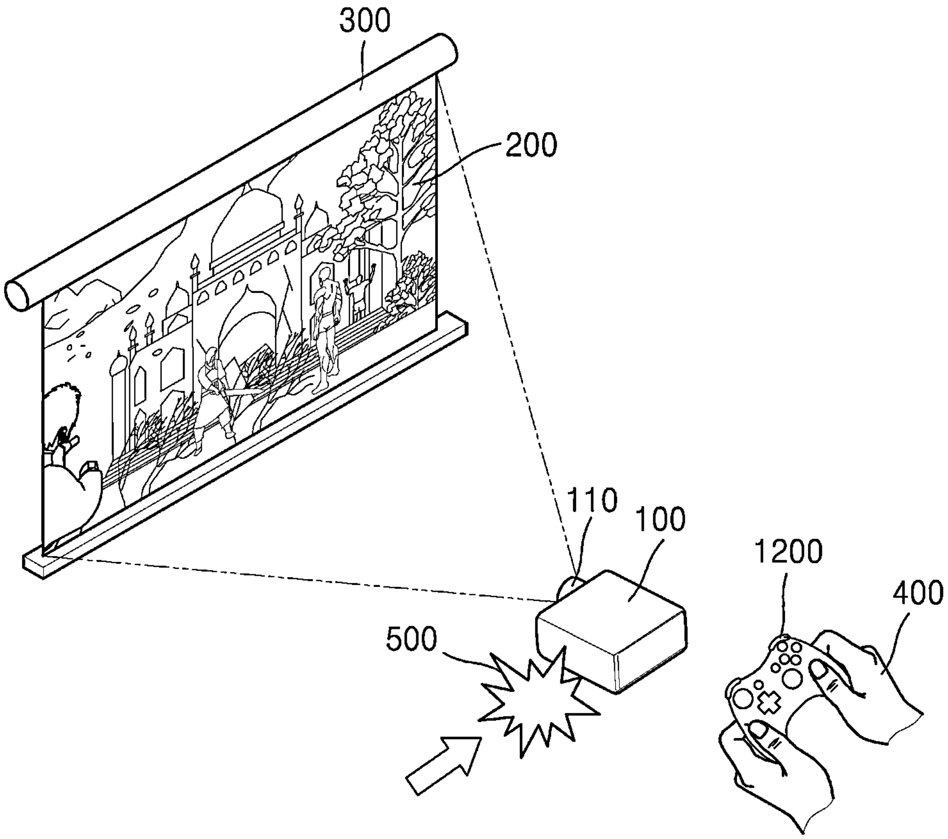
FIG. 12 is a view for explaining the operation of determining whether to perform calibration of an image display portion depending on a type of content, according to an embodiment of the disclosure.

FIG. 11 is a flowchart for explaining an operation of determining whether to perform the calibration of the image display portion 110 depending on a type of content, according to an embodiment of the disclosure. FIG. 12 is a view for explaining the operation of determining whether to perform the calibration of the image display portion 110 depending on a type of content, according to an embodiment of the disclosure. Hereinafter, like reference numerals are assigned to like configurations and operations that are the same as those described in FIGS. 1 and 3, and redundant descriptions thereof are omitted.

Referring to FIGS. 1, 2, 3, and 11, in an embodiment of the disclosure, the operating method of the electronic device 100 may include determining the type of the content 200 displayed through the image display portion 110 (S20). In an embodiment of the disclosure, in the determining of the type of the content 200 (S20), the at least one processor 130 may determine the type of the content 200 displayed through the image display portion 110.

In an embodiment of the disclosure, the type of the content 200 is not limited to any one of games, movies, photos, cartoon movies, pictures, background object images, light images, interior images, and the like. In an embodiment of the disclosure, the electronic device 100 may generate the content 200 displayed through the image display portion 110 based on the image data obtained through the input/output interface 170 or the communication interface 190. In this state, the obtained image data may include information about the type of image data. In an embodiment of the disclosure, the at least one processor 130 may determine the type of the content 200 based on the information about the type included in the image data.

However, the disclosure is not limited thereto, and the at least one processor 130 may determine the type of the content 200 based on other applications or modules executed for the operation of the electronic device 100 in addition to the image display portion 110. In an embodiment of the disclosure, when an operation of displaying the content 200 through the image display portion 110 is performed with the operation of executing a game application in the electronic device 100, the at least one processor 130 may determine the type of the content 200 as a game.

Referring to FIGS. 1, 2, 11, and 12, in an embodiment of the disclosure, the operating method of the electronic device 100 may include determining whether the determined type of the content 200 is included in a preset specific content (S30). In an embodiment of the disclosure, the preset specific content may be content that is set not to perform the perform the calibration of the image display portion 110 even when the external impact 500 is applied while content of a corresponding type is being provided.

In an embodiment of the disclosure, the preset specific content may include content that has poor visibility so as to be determined that the sensitivity of the user 400 to a change of the content 200 by the external impact 500 may be low. The preset specific content may include content that has a high level of the immersion of the user 400 is high so that, even when a change occurs in the content 200 by the external impact 500, the content 200 is set to display, without change, for the immersion of the user 400, the content 200 that has been changed (e.g., being out of focus or distorted in the horizontal direction or vertical direction), rather than distributing the immersion of the user 400 by performing an operation of calibrating the image display portion 110.

Referring to FIGS. 1, 2, 11, and 12, in an embodiment of the disclosure, FIG. 12 illustrates that the preset specific content includes a game, and the type of the content 200 displayed through the image display portion 110 of the electronic device 100 is a game. In an embodiment of the disclosure, the user 400 may enjoy the game by using an external interface 1200 and the content 200 provided by the electronic device 100.

In this case, even when the external impact 500 is applied to the electronic device 100, the electronic device 100 may not perform the calibration of the image display portion 110. When the calibration of the image display portion 110 is performed, during calibration, providing the content 200 to the user 400 is stopped so that the user 400 enjoying a game may be disturbed. Accordingly, when the type of the content 200 displayed through the image display portion 110 is determined to be one of preset specific contents, even when the external impact 500 is applied to the electronic device 100, the electronic device 100 may not perform the calibration of the image display portion 110.

In an embodiment of the disclosure, as the type of the content 200 is determined to be included in the preset specific content in the determining of whether the type of the content 200 included in the preset specific content (S30), the operating method of the electronic device 100 may include not performing the calibration of the image display portion 110 (S500). In this case, even when the amount of the external impact calculated according to the external impact 500 is greater than the preset calibration threshold value, the electronic device 100 may not perform the calibration of the image display portion 110. Accordingly, when it is important not to stop the provision of the content 200 or not to disturb the immersion of the user 400, depending on the type of the content 200, the stopping of providing the content 200 due to the calibration of the image display portion 110 may be prevented.

In an embodiment of the disclosure, as the type of the content 200 is determined not to be included in the preset specific content in the determining of whether the type of the content 200 included in to the preset specific content (S30), the operating method of the electronic device 100 may sequentially perform the calculating of the amount of the external impact by detecting the external impact 500 (S100) and the operations subsequent thereto.

Figure 13:
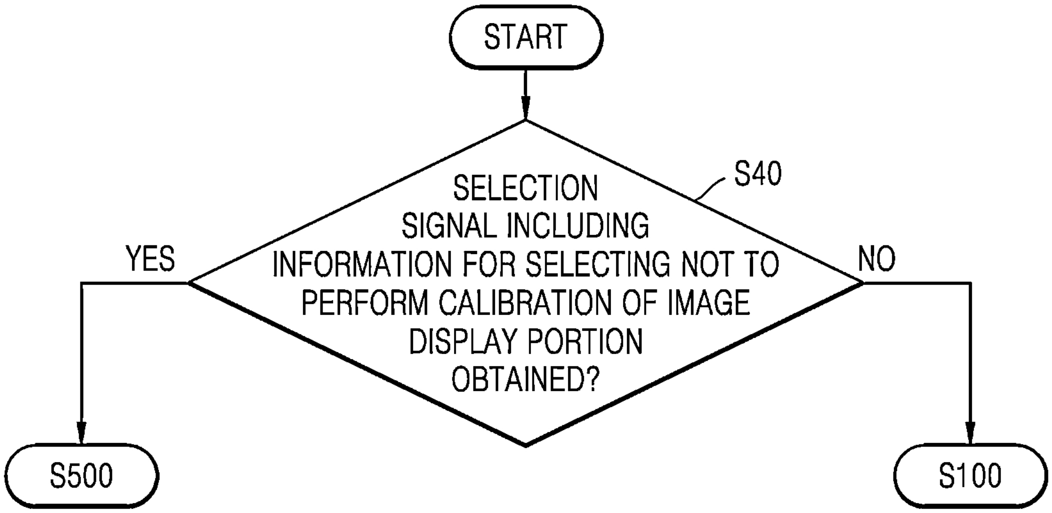
FIG. 13 is a flowchart for explaining an operation of not performing calibration of an image display portion according to a selection signal including information for selecting not to perform calibration of an image display portion, according to an embodiment of the disclosure.
Figure 14:
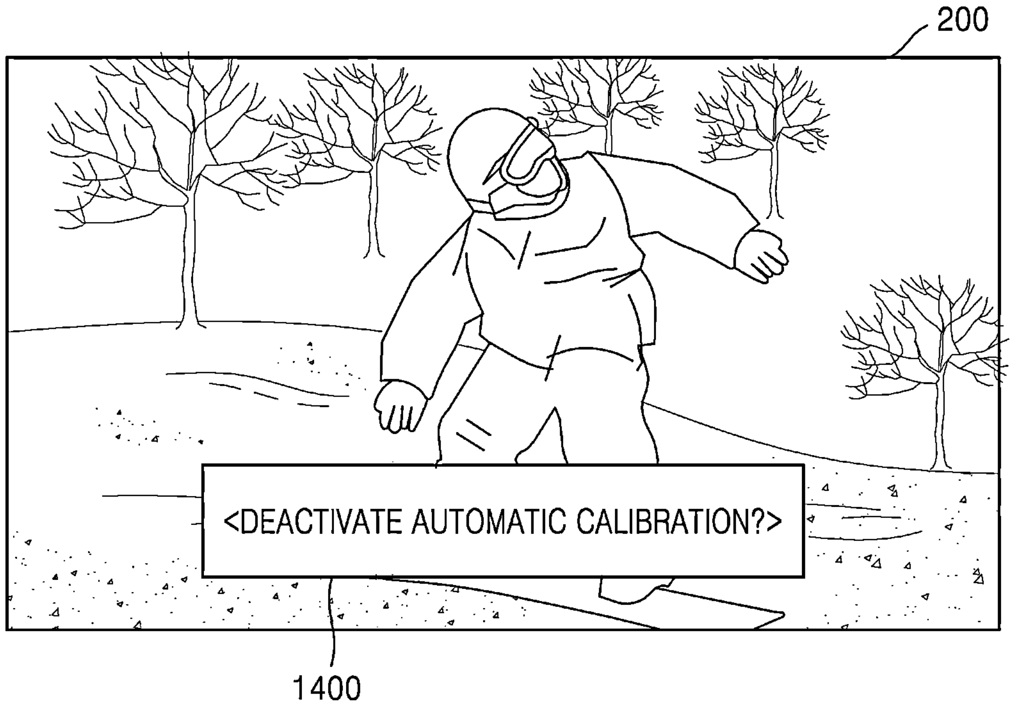
FIG. 14 is a view for explaining the operation of not performing calibration of an image display portion according to a selection signal including information for selecting not to perform calibration of an image display portion, according to an embodiment of the disclosure.

FIG. 13 is a flowchart for explaining an operation of not performing calibration on the image display portion 110 according to a selection signal including information for selecting not to perform the calibration of the image display portion 110, according to an embodiment of the disclosure. FIG. 14 is a view for explaining the operation of not performing calibration on the image display portion 110 according to a selection signal including information for selecting not to perform the calibration of the image display portion 110, according to an embodiment of the disclosure. Hereinafter, like reference numerals are assigned to like configurations and operations that are the same as those described in FIGS. 1 and 3, and redundant descriptions thereof are omitted.

Referring to FIGS. 1, 2, 3, and 13, in an embodiment of the disclosure, the operating method of the electronic device 100 may include determining whether to obtain a selection signal including information for selecting not to perform the calibration of the image display portion 110 (S40).

In an embodiment of the disclosure, the electronic device 100 may obtain, through the user interface 180, the selection signal including information for selecting not to perform the calibration of the image display portion 110. In an embodiment of the disclosure, the at least one processor 130 may determine whether the selection signal including information for selecting not to perform the calibration of the image display portion 110 has obtained.

Referring to FIGS. 1, 2, 13, and 14, in an embodiment of the disclosure, FIG. 14 illustrates the content 200 provided by the electronic device 100 and a graphic interface 1400 to select not to perform the to select not to perform the calibration of the image display portion 110. Although FIG. 14 illustrates that the graphic interface 1400 indicates "<DEACTIVATE AUTOMATIC CALIBRATION?>", the disclosure is not limited thereto. The graphic interface 1400 may be displayed by various texts, icons, pictures, or the like to provide the user 400 with information for selecting not to perform the calibration of the image display portion 110.

In an embodiment of the disclosure, the selection signal may be generated, through the graphic interface 1400, by an action to select not to perform the calibration of the image display portion 110. In an embodiment of the disclosure, the selection signal may be generated using the user interface 180, through the graphic interface 1400, by an action to select not to perform the calibration of the image display portion 110. However, the disclosure is not limited thereto, and the selection signal may be generated, through the user interface 180, by an input provided to include information for selecting not to perform the calibration of the image display portion 110, without specially providing the graphic interface 1400.

In an embodiment of the disclosure, as the selection signal is determined to have been obtained in the determining of whether the selection signal is obtained (S40), the operating method of the electronic device 100 may include not performing the calibration of the image display portion 110 (S500). In this case, even when the amount of the external impact calculated according to the external impact 500 is greater than the preset calibration threshold value, the electronic device 100 may not perform the calibration of the image display portion 110. Accordingly, according to the selection of the user 400 using the electronic device 100, the electronic device 100 may prevent the user's immersion from being disturbed by preventing the stopping of providing the content 200 by the calibration of the image display portion 110. Furthermore, whether to perform the calibration of the image display portion 110 may be determined by reflecting the preference of the user 400 using the electronic device 100.

In an embodiment of the disclosure, as the selection signal is determined to have not been obtained in the determining of whether the selection signal is obtained (S40), the operating method of the electronic device 100 may sequentially perform the calculating of the amount of the external impact by detecting the external impact 500 (S100) and the operations subsequent thereto.

Figure 15:
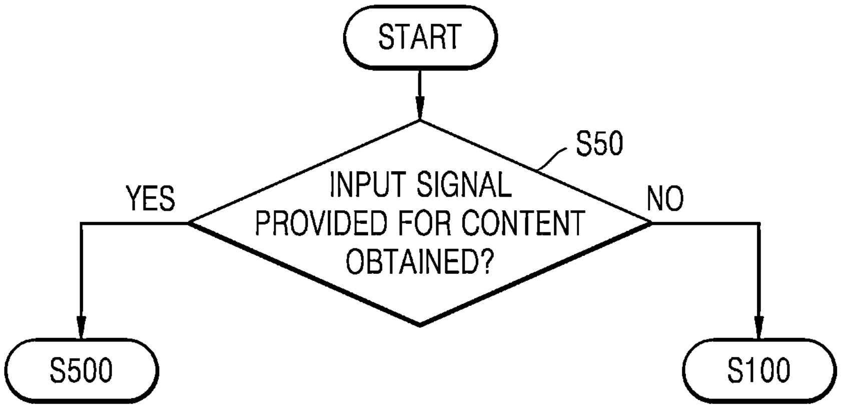
FIG. 15 is a flowchart for explaining an operation of not performing calibration of an image display portion depending on whether an input signal provided for content is obtained, according to an embodiment of the disclosure.

FIG. 15 is a flowchart for explaining an operation of not performing calibration of an image display portion depending on whether an input signal provided for content is obtained, according to an embodiment of the disclosure. Hereinafter, like reference numerals are assigned to like operations same as those described in FIG. 3, and redundant descriptions thereof are omitted.

Referring to FIGS. 1, 2, 3, 12, and 15, in an embodiment of the disclosure, the operating method of the electronic device 100 may include determining whether an input signal provided for the content 200 is obtained (S50).

In an embodiment of the disclosure, the electronic device 100 may obtain an input signal provided for the content 200 through the user interface 180. In an embodiment of the disclosure, when the content 200 is an Internet search window, the electronic device 100 may obtain an input signal by recognizing, through a gesture recognition portion that is the user interface 180, an action of the user 400 to input or click a keyword on the content 200 using a hand and the like. However, the disclosure is not limited thereto, and even when the content 200 is content, such as a virtual keyboard, a virtual blackboard, or the like, to receive an input from the user 400, the electronic device 100 may obtain an input signal provided for the content 200.

Furthermore, in an embodiment of the disclosure, the electronic device 100 may obtain, through the communication interface 190, an input signal provided for the content 200 from the external interface 1200. In an embodiment of the disclosure, FIG. 12 illustrates that the external interface 1200 is a game pad. The electronic device 100 may obtain, through the communication interface 190, an input signal provided for the content 200 from the external interface 1200 by using a game pad.

In an embodiment of the disclosure, as the input signal is determined to have been obtained in the determining of whether the input signal is obtained (S50), the operating method of the electronic device 100 may not perform the calibration of the image display portion 110. In this case, even when the amount of the external impact calculated according to the external impact 500 is greater than the preset calibration threshold value, the electronic device 100 may not perform the calibration of the image display portion 110. Accordingly, the immersion of the user 400 may not be disturbed by preventing the stopping of providing the content 200 during providing an input to the content 200 by the calibration of the image display portion 110.

In an embodiment of the disclosure, as the input signal is determined to have not been obtained in the determining of whether the input signal is obtained (S50), the operating method of the electronic device 100 may sequentially perform the calculating of the amount of the external impact by detecting the external impact 500 (S100) and the operations subsequent thereto.

The effects of the present disclosure are not limited to the above-described effects, and other various effects that are not described in the disclosure may be clearly understood from the following descriptions by one skilled in the art to which the present disclosure belongs.

A program executed by the electronic device described in the disclosure may be implemented by a hardware component, a software component, and/or a combination of the hardware component and the software component. A program may be performed by all systems capable of performing computer-readable instructions.

Software may include a computer program, code, instructions, or a combination of one or more thereof, and may configured a processing device to operate as desired or command the processing device independently or collectively.

Software may be implemented by a computer program including instructions stored in a computer-readable storage media. The computer-readable recording media may include, for example, a magnetic storage medium (e.g., read-only memory (ROM), random-access memory (RAM), a floppy disk, a hard disk, etc.), an optically readable medium (e.g., CD-ROM, a digital versatile disc (DVD)), and the like. The computer-readable recording medium can also be distributed over network coupled computer systems so that the computer-readable code is stored and executed in a distributive manner. The recording medium can be read by the computer, stored in the memory, and executed by the processor.

A computer-readable storage medium may be provided in the form of a non-transitory storage medium. Here, the term 'non-transitory' merely means that the storage medium does not refer to a transitory electrical signal but is tangible, and does not distinguish whether data is stored semi-permanently or temporarily on the storage medium. For example, the non-transitory storage medium may include a buffer in which data is temporarily stored.

Furthermore, the program according to the embodiments of the disclosure may be included in a computer program product and then provided. The computer program products may be traded as commodities between sellers and buyers.

The computer program product may include a software program and a computer-readable storage medium storing the software program. For example, a computer program product may include a product in the form of a software program (e.g., a downloadable application), which is electronically distributed through a manufacturer of an electronic device or an electronic market (e.g., Samsung Galaxy Store). For electronic distribution, at least part of a software program may be stored in a storage medium or temporarily generated. In this case, a storage medium may be a manufacturer's server, an electronic market's server, or a storage medium of a relay server that temporarily stores a software program.

As described above, although embodiments are described with reference to the limited embodiments and drawings, numerous modifications and adaptations will be readily apparent to one of ordinary skill in the art without departing from the spirit and scope of the disclosure. For example, an appropriate result may be achieved even when the described technologies are performed in a different order from the described method, and/or the constituent elements of the described system, structure, apparatus, circuit, and the like are coupled or combined in a different form from the described method, or replaced or substituted by other constituent elements or equivalents.

The invention claimed is:

1. An electronic device comprising:
an image display portion through which to display content;
a memory that stores at least one instruction; and
at least one processor configured to execute the at least one instruction stored in the memory,
wherein the at least one processor is further configured to:
identify a usage environment based on at least one of the content, an operation mode, or illuminance,
based on the identified usage environment, set a calibration threshold value,
calculate an amount of an external impact applied to the electronic device,
compare the calculated amount of the external impact and a magnitude of the set calibration threshold value, and
perform a calibration of the image display portion based on the calculated amount of the external impact being greater than the set calibration threshold value.

2. The electronic device of claim 1, wherein
the at least one processor is further configured to:
not perform the calibration of the image display portion based on the calculated amount of the external impact being less than or equal to the set calibration threshold value.

3. The electronic device of claim 1, wherein
the electronic device further comprises at least one of a time of flight (ToF) sensor, an acceleration sensor, or a gyro sensor, and
the at least one processor is configured to calculate the amount of the external impact based on detection of the external impact by the at least one of the ToF sensor, the acceleration sensor, or the gyro sensor.

4. The electronic device of claim 1, wherein
the calibration of the image display portion includes at least one of a keystone correction to correct distortion of the content displayed through the image display portion or a focus adjustment to correct a focus of the content displayed through the image display portion.

5. The electronic device of claim 1, wherein
the usage environment of the electronic device includes the operation mode of the electronic device, and
the at least one processor is configured to:
operate the electronic device in a first mode, in which the content displayed through the image display portion is displayed as augmented reality content, or in a second mode, in which the content displayed through the image display portion is displayed as real world content,
based on operating the electronic device in the first mode, set the calibration threshold value to a first value, and
based on operating the electronic device in the second mode, set the calibration threshold value to a second value,
wherein the first value is less than the second value.

6. The electronic device of claim 1, wherein
the usage environment of the electronic device includes complexity of the content displayed through the image display portion, and
the at least one processor is further configured to:
determine the complexity of the content based on at least one of an edge component included in the content displayed through the image display portion, a resolution of the content displayed through the image display portion, a frequency component of the content displayed through the image display portion, or a type of the content displayed through the image display portion, and
set the calibration threshold value based on the determined complexity of the content displayed through the image display portion.

7. The electronic device of claim 1, wherein
the usage environment of the electronic device includes the illuminance of a space in which the electronic device is located,
the at least one processor is further configured to measure the illuminance of the space, and
the magnitude of the calibration threshold value is set to be greater as the measured illuminance of the space increases.

8. The electronic device of claim 1, wherein the at least one processor is further configured to:

determine a type of the content displayed through the image display portion, and not perform the calibration of the image display portion based on the determined type of the content being included in preset specific content.

9. The electronic device of claim 1, wherein the at least one processor is further configured to not perform the calibration of the image display portion based on obtaining a selection signal including information for selecting not to perform the calibration of the image display portion.

10. The electronic device of claim 1, wherein the at least one processor is further configured to not perform the calibration of the image display portion based on obtaining an input signal provided for the content.

11. A method of operating an electronic device including an image display portion through which to display content, the method comprising:

identifying a usage environment based on at least one of the content, an operation mode, or illuminance, based on the identified usage environment, setting a calibration threshold value;

calculating an amount of an external impact applied to the electronic device;

comparing the calculated amount of the external impact with a magnitude of the set calibration threshold value; and performing a calibration of the image display portion based on the calculated amount of the external impact being greater than the set calibration threshold value in the comparing of the amount of the external impact with the calibration threshold value.

12. The method of claim 11, further comprising:

not performing the calibration of the image display portion based on the calculated amount of the external impact being less than or equal to the set calibration threshold value in the comparing of the amount of the external impact with the magnitude of the calibration threshold value.

13. The method of claim 11, wherein the electronic device includes at least one of a time of flight (ToF) sensor, an acceleration sensor, or a gyro sensor, and in the calculating of the amount of the external impact, the amount of the external impact is calculated based on detection of the external impact by the at least one of the ToF sensor, the acceleration sensor, or the gyro sensor.

14. The method of claim 11, wherein the usage environment of the electronic device includes the operation mode of the electronic device, and the method further comprises:

determining in which of the electronic device operates in a first mode, in which the content displayed through the image display portion is displayed as augmented reality content, or the electronic device operates in a second mode, in which the content displayed through the image display portion is displayed as real world content, in the setting of the calibration threshold value, based on operating the electronic device in the first mode, setting the calibration threshold value to a first value, and based on operating the electronic device in the second mode, setting the calibration threshold value to a second value, wherein the first value is less than the second value.

15. The method of claim 11, wherein the usage environment of the electronic device includes complexity of the content displayed through the image display portion, and the method further comprises:

determining the complexity of the content based on at least one of an edge component included in the content displayed through the image display portion, a resolution of the content displayed through the image display portion, a frequency component of the content displayed through the image display portion, or a type of the content displayed through the image display portion, and setting the calibration threshold value based on the determined complexity of the content displayed through the image display portion.

16. The method of claim 11, wherein the usage environment of the electronic device includes the illuminance of a space in which the electronic device is located, and the method further comprises:

measuring the illuminance of the space, and in the setting of the calibration threshold value, a magnitude of the calibration threshold value is set to be greater as the measured illuminance of the space increases.

17. The method of claim 11, further comprising:

determining a type of the content displayed through the image display portion; and not performing the calibration of the image display portion based on the determined type of the content being included in preset specific content.

18. The method of claim 11, further comprising:

determining whether a selection signal including information for selecting not to perform the calibration of the image display portion is obtained; and not performing the calibration of the image display portion based on determining that the selection signal is obtained.

19. The method of claim 11, further comprising:

determining whether an input signal provided for the content is obtained; and not performing the calibration of the image display portion based on determining that the input signal is obtained.

20. A non-transitory computer-readable recording medium having recorded thereon a program, which when executed by a computer, performs the method of claim 11.

* * * * *